(12) United States Patent
Thorpe et al.

(10) Patent No.: US 11,422,244 B2
(45) Date of Patent: Aug. 23, 2022

(54) DIGITIZATION SYSTEMS AND TECHNIQUES AND EXAMPLES OF USE IN FMCW LIDAR METHODS AND APPARATUSES

(71) Applicant: Bridger Photonics, Inc., Bozeman, MT (US)

(72) Inventors: Michael James Thorpe, Bozeman, MT (US); Peter Aaron Roos, Bozeman, MT (US)

(73) Assignee: Bridger Photonics, Inc., Bozeman, MT (US)

(*) Notice: Subject to any disclaimer, the term of this patent is extended or adjusted under 35 U.S.C. 154(b) by 158 days.

(21) Appl. No.: 16/650,816

(22) PCT Filed: Sep. 25, 2018

(86) PCT No.: PCT/US2018/052682
§ 371 (c)(1),
(2) Date: Mar. 25, 2020

(87) PCT Pub. No.: WO2019/060901
PCT Pub. Date: Mar. 28, 2019

(65) Prior Publication Data
US 2020/0278432 A1 Sep. 3, 2020

Related U.S. Application Data

(60) Provisional application No. 62/562,965, filed on Sep. 25, 2017.

(51) Int. Cl.
*G01C 3/08* (2006.01)
*G01S 7/4912* (2020.01)
(Continued)

(52) U.S. Cl.
CPC .......... *G01S 7/4917* (2013.01); *G01S 7/4913* (2013.01); *G01S 17/34* (2020.01)

(58) Field of Classification Search
CPC ....... G01S 7/4917; G01S 7/4913; G01S 17/34
See application file for complete search history.

(56) References Cited

U.S. PATENT DOCUMENTS 3,925,666 A 12/1975 Allan et al.
4,167,329 A 9/1979 Jelalian et al.
(Continued)

FOREIGN PATENT DOCUMENTS

FR 2691809 A1 * 1/2013 .......... G01S 13/343
WO 2010127151 A2 11/2010
(Continued)

OTHER PUBLICATIONS

International Search Report and Written Opinion dated Jan. 29, 2019 for PCT Application No. PCT/US2018/052682, 16 pgs.
(Continued)

*Primary Examiner* — Mark Hellner
(74) *Attorney, Agent, or Firm* — Dorsey & Whitney LLP

(57) ABSTRACT

Examples are provided that use multiple analog-to-digital converters (ADCs) to disambiguate FMCW ladar range returns from one or more targets that may be greater than the Nyquist frequencies of one or more of the ADCs. Examples are also provided that use a first and a second laser FMCW return signal (e.g., reflected beam) in combination with two or more ADCs to disambiguate one or more target ranges (e.g., distances to one or more objects).

21 Claims, 13 Drawing Sheets

(51) Int. Cl.
    *G01S 17/34* (2020.01)
    *G01S 7/4913* (2020.01)

(56) References Cited

U.S. PATENT DOCUMENTS

| | | | |
|---|---|---|---|
| 4,593,368 | A | 6/1986 | Fridge et al. |
| 4,795,253 | A | 1/1989 | Sandridge et al. |
| 4,830,486 | A | 5/1989 | Goodwin |
| 5,115,468 | A * | 5/1992 | Asahi ............ H03C 1/60 375/301 |
| 5,294,075 | A | 3/1994 | Vertatschitsch et al. |
| 5,367,399 | A | 11/1994 | Kramer |
| 5,371,587 | A | 12/1994 | De Groot et al. |
| 5,534,993 | A | 7/1996 | Ball et al. |
| 5,548,402 | A | 8/1996 | Nogiwa |
| 5,768,001 | A | 6/1998 | Kelley et al. |
| 5,859,694 | A | 1/1999 | Galtier et al. |
| 6,034,976 | A | 3/2000 | Mossberg et al. |
| 6,516,014 | B1 | 2/2003 | Sellin et al. |
| 6,822,742 | B1 | 11/2004 | Kalayeh et al. |
| 6,864,983 | B2 | 3/2005 | Galle et al. |
| 7,215,413 | B2 | 5/2007 | Soreide et al. |
| 7,292,347 | B2 | 11/2007 | Tobiason et al. |
| 7,511,824 | B2 | 3/2009 | Sebastian et al. |
| 7,742,152 | B2 | 6/2010 | Hui et al. |
| 7,920,272 | B2 | 4/2011 | Sebastian et al. |
| 8,010,300 | B1 | 8/2011 | Stearns et al. |
| 8,121,798 | B2 | 2/2012 | Lippert et al. |
| 8,175,126 | B2 | 5/2012 | Rakuljic et al. |
| 8,294,899 | B2 | 10/2012 | Wong |
| 8,582,085 | B2 | 11/2013 | Sebastian et al. |
| 8,730,461 | B2 | 5/2014 | Andreussi |
| 8,781,755 | B2 | 7/2014 | Wong |
| 8,913,636 | B2 | 12/2014 | Roos et al. |
| 9,030,670 | B2 | 5/2015 | Warden et al. |
| 9,559,486 | B2 | 1/2017 | Roos et al. |
| 9,696,423 | B2 | 7/2017 | Martin |
| 9,759,597 | B2 | 9/2017 | Wong |
| 9,784,560 | B2 | 10/2017 | Thorpe et al. |
| 9,864,060 | B2 | 1/2018 | Sebastian et al. |
| 9,970,756 | B2 | 5/2018 | Kreitinger et al. |
| 10,247,538 | B2 | 4/2019 | Roos et al. |
| 2002/0071122 | A1 | 6/2002 | Kulp et al. |
| 2003/0043437 | A1 | 3/2003 | Stough et al. |
| 2004/0088113 | A1 | 5/2004 | Spoonhower et al. |
| 2004/0105087 | A1 | 6/2004 | Gogolla et al. |
| 2005/0078296 | A1 | 4/2005 | Bonnet |
| 2005/0094149 | A1 | 5/2005 | Cannon |
| 2006/0050270 | A1 | 3/2006 | Elman |
| 2006/0162428 | A1 | 7/2006 | Hu et al. |
| 2006/0203224 | A1 * | 9/2006 | Sebastian ............ G01C 3/08 356/4.09 |
| 2008/0018881 | A1 | 1/2008 | Hui et al. |
| 2008/0018901 | A1 | 1/2008 | Groot |
| 2009/0046295 | A1 | 2/2009 | Kemp et al. |
| 2009/0153872 | A1 | 6/2009 | Sebastian et al. |
| 2009/0257622 | A1 | 10/2009 | Wolowelsky et al. |
| 2010/0007547 | A1 | 1/2010 | D'Addio |
| 2010/0091278 | A1 | 4/2010 | Liu et al. |
| 2010/0131207 | A1 | 5/2010 | Lippert et al. |
| 2011/0069309 | A1 | 3/2011 | Newbury et al. |
| 2011/0164783 | A1 | 7/2011 | Hays et al. |
| 2011/0205523 | A1 | 8/2011 | Rezk et al. |
| 2011/0213554 | A1 | 9/2011 | Archibald et al. |
| 2011/0273699 | A1 | 11/2011 | Sebastian et al. |
| 2011/0292403 | A1 | 12/2011 | Jensen et al. |
| 2012/0106579 | A1 | 5/2012 | Roos et al. |
| 2012/0293358 | A1 * | 11/2012 | Itoh ............ G01S 3/74 342/107 |
| 2013/0104661 | A1 | 5/2013 | Klotz et al. |
| 2013/0162976 | A1 * | 6/2013 | Dakin ............ G01S 7/4917 356/28.5 |
| 2014/0002639 | A1 | 1/2014 | Cheben et al. |
| 2014/0036252 | A1 | 2/2014 | Amzajerdian et al. |
| 2014/0139818 | A1 | 5/2014 | Sebastian et al. |
| 2014/0204363 | A1 | 7/2014 | Slotwinski et al. |
| 2015/0019160 | A1 | 1/2015 | Thurner et al. |
| 2015/0185313 | A1 | 7/2015 | Zhu |
| 2015/0355327 | A1 | 12/2015 | Goodwin et al. |
| 2016/0123718 | A1 | 5/2016 | Roos et al. |
| 2016/0123720 | A1 * | 5/2016 | Thorpe ............ G01B 9/02004 356/498 |
| 2016/0202225 | A1 | 7/2016 | Feng et al. |
| 2016/0259038 | A1 | 9/2016 | Retterath et al. |
| 2016/0261091 | A1 | 9/2016 | Santis et al. |
| 2017/0097302 | A1 | 4/2017 | Kreitinger et al. |
| 2017/0115218 | A1 | 4/2017 | Huang et al. |
| 2017/0131394 | A1 | 5/2017 | Roger et al. |
| 2017/0146335 | A1 | 5/2017 | Martinez et al. |
| 2017/0191898 | A1 | 7/2017 | Rella et al. |
| 2017/0343333 | A1 | 11/2017 | Thorpe et al. |
| 2018/0188369 | A1 | 7/2018 | Sebastian et al. |
| 2018/0216932 | A1 | 8/2018 | Kreitinger et al. |
| 2019/0086517 | A1 * | 3/2019 | Puglia ............ G01S 7/4817 |
| 2019/0170500 | A1 | 6/2019 | Roos et al. |
| 2019/0285409 | A1 | 9/2019 | Kreitinger et al. |
| 2019/0383596 | A1 | 12/2019 | Thorpe et al. |
| 2020/0011994 | A1 | 1/2020 | Thorpe et al. |
| 2020/0149883 | A1 | 5/2020 | Thorpe et al. |
| 2021/0055180 | A1 | 2/2021 | Thorpe et al. |
| 2021/0190953 | A1 | 6/2021 | Roos et al. |
| 2022/0057202 | A1 | 2/2022 | Kreitinger et al. |

FOREIGN PATENT DOCUMENTS

| | | |
|---|---|---|
| WO | 2014088650 A1 | 6/2014 |
| WO | 2016064897 A1 | 4/2016 |
| WO | 2017187510 A1 | 11/2017 |
| WO | 2018170478 | 9/2018 |
| WO | 2019060901 A1 | 3/2019 |
| WO | 2019070751 A1 | 4/2019 |
| WO | 2019079448 A1 | 4/2019 |
| WO | 2019099567 | 5/2019 |

OTHER PUBLICATIONS

U.S. Appl. No. 16/734,769 titled "Gas-Mapping 3D Imager Measurement Techniques and Method of Data Processing" filed Jan. 6, 2020.

U.S. Appl. No. 15/285,787, entitled "Gas-Mapping 3D Imager Measurement Techniques and Method of Data Processing", filed Oct. 5, 2016.

U.S. Appl. No. 15/680,076, entitled "Length Metrology Apparatus And Methods For Suppressing Phase Noise-Induced Distance Measurement Errors", filed Aug. 17, 2017, pp. all.

U.S. Appl. No. 15/936,247, titled "High-Sensitivity Gas-Mapping 3D Imager and Method of Operation", filed Mar. 26, 2018.

U.S. Appl. No. 16/551,075 titled "Length Metrology Apparatus and Methods for Suppressing Phase Noise-Induced Distance Measurement Errors" filed Aug. 26, 2019.

Amann, et al., ""Laser ranging: a critical review of usual techniques for distance measurement," Optical Engineering, vol. 40(1) pp. 10-19 (Jan. 2001)".

Barber, et al., ""Accuracy of Active Chirp Linearization for Broadband Frequency Modulated Continuous Wave Ladar," Applied Optics, vol. 49, No. 2, pp. 213-219 (Jan. 2010)".

Barker, , ""Performance enhancement of intensity-modulated laser rangefinders on natural surfaces"", SPIE vol. 5606, pp. 161-168 (Dec. 2004).

Baumann, et al., ""Speckle Phase Noise in Coherent Laser Ranging Fundamental Precision Limitations," Optical Letters, vol. 39, Issue 16, pp. 4776-4779 (Aug. 2014)".

Boashash, , ""Estimating and Interpreting the Instantaneous Frequency of a Signal—Part 2: Algorithms and Applications"", Proceedings of the IEEE, vol. 80, No. 4, pp. 540-568 (Apr. 1992).

Bomse, et al., ""Frequency modulation and wavelength modulation spectroscopies: comparison of experimental methods using a lead-salt diode laser"", Appl. Opt., 31, pp. 718-731 (Feb. 1992).

Choma, et al., ""Sensitivity Advantage of Swept Source and Fourier Domain Optical Coherence Tomography," Optical Express, vol. 11, No. 18, 2183 (Sep. 2003)".

(56) References Cited

OTHER PUBLICATIONS

Ciurylo, "Shapes of pressure- and Doppler-broadened spectral lines in the core and near wings", Physical Review A, vol. 58 No. 2, pp. 1029-1039 (Aug. 1998).
Dharamsi, "A theory of modulation spectroscopy with applications of higher harmonic detection", J. Phys. D: Appl. Phys 29, pp. 540-549 (Jun. 1995; 1996) (Retrieved Jan. 16, 2017).
Emran, Bara J. et al., "Low-Altitude Aerial Methane Concentration Mapping", School of Engineering, The University of British Columbia, Aug. 10, 2017, pp. 1-12.
Fehr, et al., ""Compact Covariance Descriptors in 3D Point Clouds for Object Recognition"", 2012 IEEE International Conference on Robotics and Automation, pp. 1793-1798, (May 2012).
Fransson, Karin et al., "Measurements of VOCs at Refineries Using the Solar Occultation Flux Technique", Department of Radio and Space Science, Chalmers University of Technology, 2002, 1-19.
Fujima, et al., ""High-resolution distance meter using optical intensity modulation at 28 GHz"", Meas. Sci. Technol. 9, pp. 1049-1052 (May 1998).
Gilbert, et al., ""Hydrogen Cyanide H13C14N Absorption Reference for 1530 nm to 1565 nm Wavelength Calibration—SRM 2519a"", NIST Special Publication 260-137 2005 ED, 29 pages, (Aug. 2005).
Hariharan, , ""Basics of Interferometry"", Elsevier Inc. ISBN 0-12-373589-0 (2007).
Iiyama, et al., "Linearizing Optical Frequency-Sweep of a Laser Diode for FMCW Reflectrometry", Iiyama et al. Journal of Lightwave Technology, vol. 14, No. 2, Feb. 1996.
Iseki, et al., "A Compact Remote Methane Sensor using a Tunable Diode Laser", Meas. Sci. Technol., 11, 594, pp. 217-220 (Jun. 2000).
Jia-Nian, et al., ""Etalon effects analysis in tunable diode laser absorption spectroscopy gas concentration detection system based on wavelength modulation spectroscopy"", IEEE SOPO, pp. 1-5 (Jul. 2010).
Johnson, et al., ""Using Spin-Images for Efficient Object Recognition in Cluttered 3D Scenes"", IEEE Transactions on Pattern Analysis and Machine Intelligence, vol. 21, No. 5, 37 pages (Published May 1999).
Karlsson, et al., "Linearization of the frequencysweep of a frequency-modulated continuous-wave semiconductor laser radar and the resulting ranging performance", Christer J. Karlsson et al, Applied Optics, vol. 38, No. 15, May 20, 1999, pp. 3376-3386.
Karmacharya, et al., ""Knowledge guided object detection and indentification in 3D point clouds"", SPIE 9528, 952804-952804-13 (Jun. 2015).
Lenz, Dawn et al., "Flight Testing of an Advanced Airborne Natural Gas Leak Detection System", ITT Industries Space Systems Division, Oct. 2005, all.
Lu, et al., "Differential wavelength-scanning heterodyne interferometer for measuring large step height", Applied Optics, vol. 41, No. 28, Oct. 1, 2002.
Masiyano, et al., ""Use of diffuse reflections in tunable diode laser absorption spectroscopy: implications of laser speckle for gas absorption measurements"", Appl. Phys. B 90, pp. 279-288 (Feb. 2008).
Mather, T.A. et al., "A reassessment of current volcanic emissions from the Central American arc with specific examples from Nicaragua", Journal of Volcanology and Geothermal Research, Nov. 2004, 297-311.
Ngo, et al., ""An isolated line-shape model to go beyond the Voigt profile in spectroscopic databases and radiative transfer codes"", Journal of Quantitative Spectroscopy and Radiative Transfer, 129, pp. 89-100 (Nov. 2013).
Olsovsky, et al., ""Chromatic Confocal Microscopy for Multi-depth Imaging of Epithelial Tissue," Biomedical Optics Express, vol. 4, No. 5, pp. 732-740 (May 2013)".
Paffenholz, , ""Direct geo-referencing of 3D point clouds with 3D positioning sensors"", (Doctoral Thesis), Leibniz Universität Hannover, 138 pages (Sep. 2012).
Polyanksy, et al., ""High-Accuracy CO2 Line Intensities Determined from Theory and Experiment"", Physical Review Letters, 114, 5 pages (Jun. 2015).
Rao, , ""Information and the accuracy attainable in the estimatin of statistical parameters"", Bull. Calcutta Math. Soc., 37,pp. 81-89 (1945, reprinted 1992) (Retrieved Jan. 10, 2017).
Riris, et al., ""Airborne measurements of atmospheric methane column abundance using a pulsed integrated-path differential absorption lidar"", Applied Optics, vol. 51, No. 34, pp. 8296-8305 (Dec. 2012).
Roos, et al., "Ultrabroadband optical chirp linearization for precision metrology applications", Optics Letters, vol. 34, Issue 23, pp. 3692-3694 (2009).
Rothman, et al., ""The HITRAN 2008 molecular spectroscopic database"", Journal of Quantitative Spectroscopy & Radiative Transfer, 110, pp. 533-572 (Jul. 2009).
Rusu, et al., ""Fast Point Feature Histograms (FPFH) for 3D Registration"", IEEE Int. Conf. Robot., pp. 3212-3217 (May 2009).
Sandsten, et al., ""Volume flow calculations on gas leaks imaged with infrared gas-correlation"", Optics Express, vol. 20, No. 18, pp. 20318-20329 (Aug. 2012).
Sheen, et al., "Frequency Modulation Spectroscopy Modeling for Remote Chemical Detection." PNNL 13324 (Sep. 2000).
Silver, , ""Frequency-modulation spectroscopy for trace species detection: theory and comparison among experimental methods"", Appl. Opt., vol. 31 No. 6, pp. 707-717 (Feb. 1992).
Sirat, et al., ""Conoscopic Holography," Optics Letters, vol. 10, No. 1 (Jan. 1985)".
Sivananthan, , Integrated Linewidth Reduction of Rapidly Tunable Semiconductor Lasers Sivananthan, Abirami, Ph.D., University of California, Santa Barbara, 2013, 206; 3602218.
Stone, et al., ""Performance Analysis of Next-Generation LADAR for Manufacturing, Construction, and Mobility," NISTIR 7117 (May 2004)".
Thoma, Eben D. et al., "Open-Path Tunable Diode Laser Absorption Spectroscopy for Acquisition of Fugitive Emission Flux Data", Journal of the Air & Waste Management Association (vol. 55), Mar. 1, 2012, 658-668.
Twynstra, et al., ""Laser-absorption tomography beam arrangement optimization using resolution matrices"", Applied Optics, vol. 51, No. 29, pp. 7059-7068 (Oct. 2012).
Xi, et al., "Generic real-time uniorm K-space sampling method for high-speed swept-Source optical cohernece tomography", Optics Express, vol. 18, No. 9, pp. 9511-9517 (Apr. 2010).
Zakrevskyy, et al., ""Quantitative calibration- and reference-free wavelength modulation spectroscopy"", Infrared Physics & Technology, 55, pp. 183-190 (Mar. 2012).
Zhao, et al., ""Calibration-free wavelength-modulation spectroscopy based on a swiftly determined wavelength-modulation frequency response function of a DFB laser"", Opt. Exp., vol. 24 No. 2, pp. 1723-1733 (Jan. 2016).
Zhao, Yanzeng et al., "Lidar Measurement of Ammonia Concentrations and Fluxes in a Plume from a Point Source", Cooperative Institute for Research in Environmental Studies, University of Colorado/NOAA (vol. 19), Jan. 2002, 1928-1938.
U.S. Appl. No. 16/966,451 titled "Apparatuses and Methods for Gas Flux Measurements" filed Jul. 30, 2020.
U.S. Appl. No. 17/399,106 titled "High-Sensitivity Gas-Mapping 3D Imager and Method of Operation" filed Aug. 12, 2021.

\* cited by examiner

DIGITIZATION SYSTEMS AND TECHNIQUES AND EXAMPLES OF USE IN FMCW LIDAR METHODS AND APPARATUSES

CROSS-REFERENCE TO RELATED APPLICATION(S)

This application is a 35 U.S.C. § 371 National Stage Application of PCT Application No PCT/US2018/052682, filed Sep. 25, 2018, which claims the benefit under 35 U.S.C. § 119 of the earlier tiling dare of U.S. Provisional Application Serial No. 62/562,965 filed Sep. 25, 2017, the entire contents of which are hereby incorporated by reference, in their entirety, for any purposes.

TECHNICAL FIELD

Examples described herein relate to the field of optical distance measurement, including light detection and ranging (LiDAR) systems and methods, such as frequency-modulated continuous-wave (FMCW) LiDAR systems and methods, or and length metrology. Examples of systems and methods which may provide advantageous digitization are described.

BACKGROUND

FMCW ladar generally refers to a form of coherent laser distance measurement that may use substantially linear frequency modulation of a laser output, which is referred to as a form of frequency 'chirp', to achieve distance measurements. The laser frequency may be directly chirped, or the frequency chirp may be imparted to the laser frequency by a modulator that may be external to the laser. FMCW ladar uses optical heterodyne detection, which can provide quantum-noise-limited measurement signals, and allow measurements with a large dynamic range of signal powers due the square root dependence of the FMCW signal on the scattered optical power received from the target. If desired, direct modulation of the laser output frequency can result in large chirp bandwidths, and therefore, high-resolution distance measurements due to the well-known relationship, $\Delta R = c/2B$, where $\Delta R$ is the range resolution, c is the speed of light and B is the chirp bandwidth. Chirped sideband modulation using an RF chirp and, for instance, an optical modulator, is also possible. Production of highly-linear laser frequency chirps can lead to the achievement of substantially Fourier-limited range peaks, and the realization Cramer-Rao-limited distance measurement precisions ($\sigma \approx \Delta R/\sqrt{SNR}$, where SNR is the RF power signal-to-noise ratio of the range measurement).

Existing optical measurement techniques and systems (e.g., existing LiDAR systems) may require larger complexity, ambiguous range, and/or greater processing time that may be available or desired in some applications.

SUMMARY

Examples of methods are described herein. An example method includes providing an interference signal from a frequency-modulated continuous-wave (FMCW) laser radar system, the interference signal based in part on a laser beam reflected from an object, digitizing the interference signal using a digitizer having a Nyquist frequency lower than an actual beat frequency of the interference signal to produce a digitized signal, the digitized signal consistent with multiple candidate beat frequencies, processing the digitized signal to select one of the multiple candidate beat frequencies corresponding to the actual beat frequency, and determining a distance to at least a portion of the object based on the beat frequency.

In some examples, the digitizer may include a first analog to digital converter (ADC). The digitized signal may include a first digitized signal corresponding to an output of the first ADC and the first digitized signal may be consistent with first multiple beat frequencies. An example method may further include digitizing the interference signal using a second ADC having a second Nyquist frequency to produce a second digitized signal, the second digitized signal consistent with a second set of multiple candidate beat frequencies, and the processing may include selecting a matching one from the first and second set of multiple candidate beat frequencies.

Examples of systems are described herein. An example system may include at least one chirped laser beam configured to be directed toward, and at least partially reflected by, an object to provide a reflected laser beam. The system may include a detector configured to combine the at least one chirped laser beam with the reflected laser beam to provide an interference signal. The system may include a first analog to digital converter configured to provide a first digital signal based on the interference signal, the first analog to digital converter having a first Nyquist frequency below a beat frequency of the interference signal. The system may include a second analog to digital converter configured to provide a second digital signal based on the interference signal, the second analog to digital converter having a second Nyquist frequency. The system may include at least one processor configured to determine a range to the object based on the first digital signal and the second digital signal.

In some examples, the first digital signal may be consistent with a first set of multiple candidate beat frequencies and the second digital signal may be consistent with a second set of multiple candidate beat frequencies. The processor may be configured to identify an actual beat frequency based on a candidate beat frequency included in both the first set of multiple candidate beat frequencies and the second set of multiple candidate beat frequencies.

Another example method may include chirping a first laser beam and a second laser beam in opposite directions to provide a first chirped beam and a second chirped beam, providing a first local oscillator beam based on the first chirped beam and a second local oscillator beam based on the second chirped beam, applying a frequency shift to the first chirped beam and the second chirped beam to provide a frequency shifted first chirped beam and a frequency shifted second chirped beam, directing the first chirped beam and the second chirped beam toward an object, receiving a first reflected beam corresponding to reflection of the first chirped beam from the object and a second reflected beam corresponding to a reflection of the second chirped beam from the object, generating a first interference signal between the first reflected beam and the first local oscillator beam and generating a second interference signal between the second reflected beam and the second local oscillator beam, and determining a distance to the object based on the first interference signal and the second interference signal.

Another example system may include at least one laser source, the at least one laser source configured to generate a first chirped laser and a second chirped laser, the first chirped laser and the second chirped laser chirped in opposite directions. The system may include a modulator configured to provide a shifted version of the first chirped laser and the second chirped laser for use as a first local oscillator and a second local oscillator. The system may include a combiner configured to combine the first local oscillator with a reflection of the first chirped laser from an object, and to combine the second local oscillator with a reflection of the second chirped laser from the object to generate a first interference signal and a second interference signal, respectively. The system may include a processor configured to determine a range to at least a portion of the object using the first interference signal and the second interference signal.

DETAILED DESCRIPTION

Certain details are set forth herein to provide an understanding of described embodiments of technology. However, other examples may be practiced without various of these particular details. In some instances, well-known circuits, control signals, timing protocols, LiDAR system components, automotive components, metrology system components, software operations, and/or other components or operations have not been shown in detail in order to avoid unnecessarily obscuring the described embodiments. Other embodiments may be utilized, and other changes may be made, without departing from the spirit or scope of the subject matter presented here.

Examples described herein may be used to realize extended-range, high-resolution, lower processing demand, and/or lower-cost frequency-modulated continuous-wave (FMCW) laser radar (ladar). The terms LiDAR and LADAR may be used interchangeably herein. Examples described herein may allow for sparse (e.g., a low fraction of signal-populated range bins compared to the total number of range bins) measurements while maintaining an overall range of available distances. This may allow range profiles (e.g., interference signals based on reflected laser beams) to be more expeditiously processed, since the profile may contain less data (e.g., fewer data points). Examples described herein may find application in automotive lidar, where sparse range profiles may be obtained and processing is generally desired to be performed as fast as possible. Examples are provided that use multiple analog-to-digital converters (ADCs) to disambiguate FMCW ladar range returns from one or more targets that may or may not be greater than the Nyquist frequencies of one or more of the ADCs. Examples are also provided that use a first and a second laser FMCW return signal (e.g., reflected beam) in combination with two or more ADCs to disambiguate one or more target ranges (e.g., distances to one or more objects). Examples are also provided that use an optical modulator to disambiguate interference signals for use with one or more ADCs.

Figure 1:
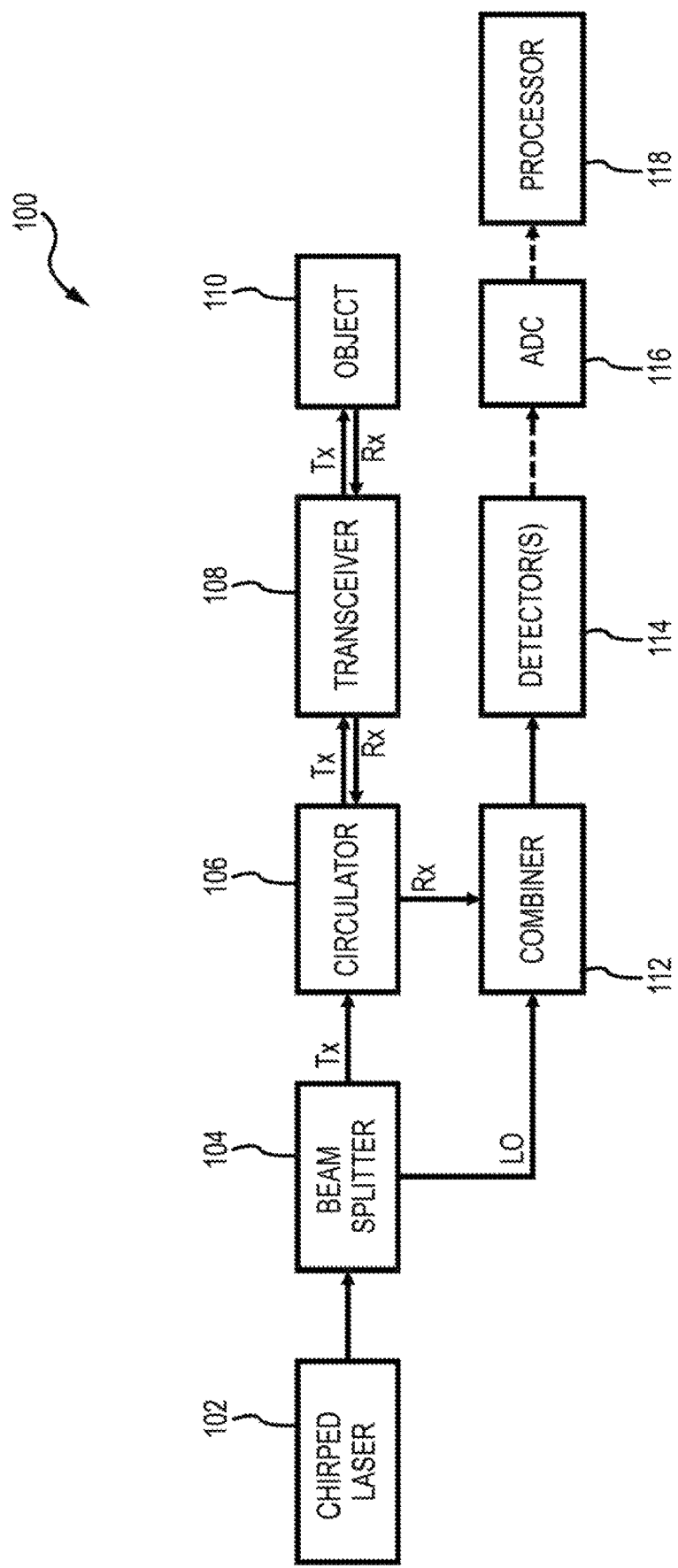
FIG. 1 is a schematic illustration of a system 100 arranged in accordance with examples described herein.

FIG. 1 is a schematic illustration of a system 100 arranged in accordance with one embodiment. The system 100 includes laser source 102, beam splitter 104, circulator 106, transceiver 108, combiner 112, detector 114, digitizer 116 and processor 118. The system 100 may be used to measure properties of (e.g., distance to) object 110. The laser source 102 is positioned to provide a laser beam to beam splitter 104. The beam splitter 104 splits the laser beam into a transmit (Tx) beam and a local oscillator (LO) beam. The circulator 106 may receive the transmit beam and provide to transceiver 108. The transceiver 108 may direct the transmit beam toward object 110. The transmit beam may be reflected from object 110. Reflection as used herein may refer to laser beams that are reflected and/or scattered from an object. The reflected laser beam (Rx), which may be referred to as a range return, may be received by transceiver 108. The transceiver 108 may provide the reflected laser beam to the circulator 106. The circulator 106 may provide the reflected laser beam to the combiner 112. The combiner 112 may combine the local beam and the reflected laser beam to provide a combined beam, which may be directed onto a detector 114. The combined beam detected by the detector 114 may produce an interference signal corresponding to one or more range returns. The interference signal resulting from a range return may be digitized by the digitizer 116 (e.g., an analog to digital converter (ADC)) to provide a digital signal. The digital signal may be processed by processor 118 to determine one or more properties of the object 110 (e.g., distance to the target). The digital signal may be processed to produce signal strength as a function of range, which may be referred to as a range profile. Additional, fewer, and/or different components may be used in some examples.

The system 100 may be a frequency-modulated continuous-wave (FMCW) system, e.g. an FMCW LiDAR system 100, and/or a laser radar (ladar) system.

Examples of systems described herein accordingly may include one or more laser sources, such as laser source 102. Generally a laser source may produce coherent light (e.g., a laser beam) having a frequency that is often in the optical or infrared portion of the electromagnetic spectrum. Examples of laser sources which may be used include, but are not limited to, semiconductor, optically pumped semiconductor, and solid-state laser sources. Laser sources described herein may provide laser beams having a frequency—while any frequencies may be used, in some examples, frequencies in the optical or infrared range may be used.

In some examples, systems described herein may provide a chirped laser beam. For example, the laser source 102 may provide a chirped laser beam. Accordingly, the laser source 102 may include an actuator which may be coupled to a source of the laser beam which may control a frequency or other parameter (e.g., phase) of the laser beam to provide a chirped laser beam. Examples of actuators which may be used include, but are not limited to, circuitry to control current provided to the laser source (e.g., laser injection current), or a mechanism to change the laser cavity length. Other actuators may additionally or instead be used. Actuators may be internal or external to and/or external to laser sources. Each chirped laser (e.g., each laser source) may have any number of associated actuators, including 1, 2, 3, or another number of actuators. Generally, a chirping a laser beam or a chirped laser beam may refer to frequency modulation of a laser output (e.g., a frequency modulated laser beam). The frequency modulation may be linear in some examples (e.g., a linear chirp). The laser frequency may be directly chirped via a frequency actuator within the laser, or the frequency chirp may be imparted to the laser frequency by a modulator that may be external to the laser, or the frequency chirp may be generated in any other fashion. Generally, an actuator may be used to modulate or otherwise adjust a frequency of a laser source (e.g., laser source 102 of FIG. 1). Any chirp rate may be used. In some examples, chirp rates of $10^{14}$ Hz/second may be used.

Examples of systems described herein may utilize any number of chirped lasers. While a single laser source 102 is shown in the example of FIG. 1, in other examples, other numbers of chirped lasers may be used. Certain of the chirped lasers may have different frequencies and/or chirp rates. In some examples, certain of the chirped lasers may have a same frequency and/or chirp rate.

Examples of systems described herein may include one or more splitters, such as beam splitter 104 of FIG. 1. The beam splitter 104 may be used to split one or more laser beams, e.g., from laser source 102, into a portion (a transmit portion, Tx) provided for use in directing toward (e.g., illuminating) an object (e.g., provided to the circulator 106 and transceiver 108 of FIG. 1) and a portion (a local oscillator portion, LO) which may not travel to the object. Generally, any beamsplitter may be used to implement splitters described herein. Beamsplitters may generally be implemented using one or more optical components that may reflect or otherwise couple a portion of a laser beam incident on the beamsplitter into a first path and transmit another portion of the laser beam incident on the beamsplitter into a second path. In some examples, polarizing beamtplitters may be used. Generally, a splitter may provide a portion of its respective incident laser beam to each of multiple paths. Generally, splitters may split incident light in any fractional portion.

Examples of systems described herein may include one or more circulators, such as circulator 106 of FIG. 1. The circulator 106 may be an optical circulator, and may be implemented using a polarization-dependent or polarization independent circulator. An optical circulator may generally provide different outputs such that an input beam may be provided to a first output, and any beam reflected from the first output may be provided to a second output. The circulator 106 may provide the transmit portion (Tx) of a laser beam from beam splitter 104 to the transceiver 108 to be directed toward object 110. The circulator 106 may act to separate a reflected laser beam (Rx) received back from the object 110, and may provide the reflected laser beam, Rx, to combiner 112. A beam splitter or combiner may also be used as a circulator.

Examples of systems described herein may include one or more transceivers, such as transceiver 108 of FIG. 1. The transceiver 108 may be used to direct a laser beam (e.g., the transmit portion Tx of a laser beam from laser source 102 in FIG. 1) toward an object, such as object 110 of FIG. 1. A transceiver may generally direct a laser beam through optical components and/or a reflector and toward an object (e.g., object 110) to interrogate (e.g., illuminate) the object. The laser beam output by the transceiver toward the object may accordingly be based on the output of one or more laser sources, e.g., one or more chirped lasers (e.g., laser source 102 of FIG. 1). The transceiver may be stationary in some examples and may be mobile in some examples. The transceiver may include a beam scanner or other component(s) to spatially scan a laser beam. The transceiver may provide a portion of an incident beam as an output directed toward a partial reflector and an object. In some examples, the partial reflector may reflect a portion of the laser beam received from the transceiver back to other components of the system, which portion may be referred to as a local oscillator (LO) in some examples. The partial reflector may alternatively be placed within or prior to the transceiver and may serve the purpose of the beam splitter and combiner. The object may reflect a portion of the laser beam received from the transceiver back to the transceiver, and the reflected laser beam (e.g., a return or receive portion Rx) may be provided to circulator 106. Laser right returning from the target to circulator 106 may be provided to a combiner 112 to produce an interference signal related to a property of the target (e.g., a distance to the target). The transceiver may be split into a transmitter portion and a receiver portion, which may be spatially separated (e.g., bistatic transceiver). One or more optical paths may be a fiber optic path.

Examples of systems described herein may include one or more combiners, such as combiner 112 of FIG. 1. The combiner 112 may interferometrically combine the local portion of a laser beam (e.g., LO) and a reflected laser beam (e.g., Rx) and direct the interferometric combination onto an optical detector to produce an interference signal. Accordingly, the interference signal may be an electronic signal provided by the detector 114.

Examples of systems described herein may include one or more detectors, such as detector 114 of FIG. 1. The detector may be implemented using any optical detector which may convert an incident interferometric combination into an electronic signal.

Examples of systems described herein may include one or more digitizers, such as digitizer 116 of FIG. 1. The digitizer may receive an interference signal from a detector, which may be an analog or denser digital signal, and may convert the interference signal into a digitized signal.

Examples of systems described herein may include one or more processors, such as processor 118 of FIG. 1. The processor may be implemented using one or more signal processors (e.g., circuitry, filters, central processing units (CPUs), processor core(s), digital signal processors (DSPs), application specific integrated circuits (ASICs) and/or other processing elements). In some examples, memory may also be provided, and the processor may execute software (e.g., executable instructions encoded in the memory). The software may include executable instructions for signal processing and/or determining one or more properties of the object 110 based on the digitized interference signal.

Examples of systems described herein may accordingly be used to determine one or more properties of an object. Any of a variety of objects may be used. For example, any target and/or surface. Examples include, but are not limited to, automobiles, signs, people, trees, buildings, retro-reflectors, tooling balls, metals, or optical surfaces. Objects may be stationary or may be moving. The term object may be used synonymously with the term target herein. The term surface may also be used. Any of a variety of properties may be determined (e.g., measured) using systems described herein, including distance (e.g., range), velocity and/or acceleration. The term distance may be used synonymously with range as described herein. The terms position or location may also be used.

Figure 2B:
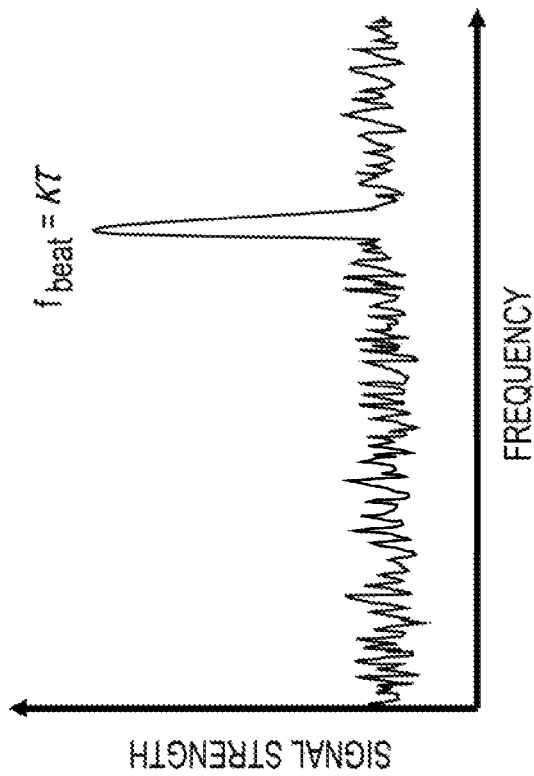
FIG. 2B is an example plot of signal strength of a Fourier transform of an interference signal provided by the system of FIG. 1 arranged in accordance with examples described herein.
Figure 2A:
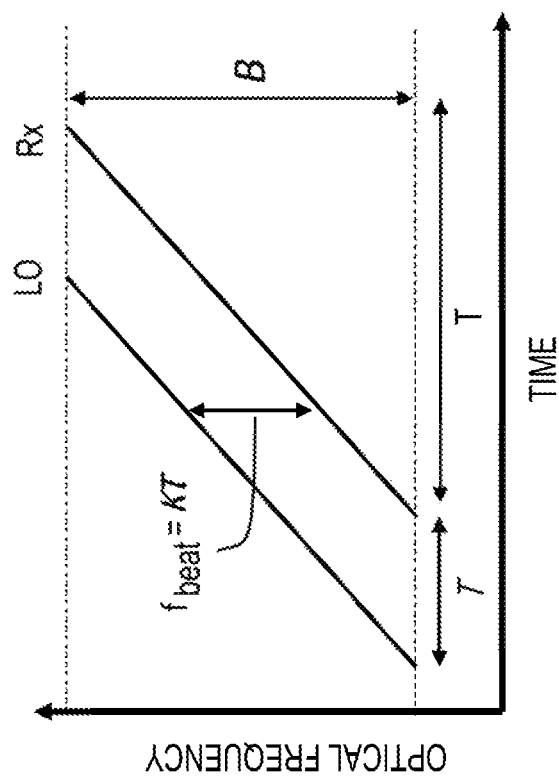
FIG. 2A is an example plot of optical frequency of the LO and Rx signals shown in FIG. 1 over time.

FIG. 2A shows an example plot of the LO and Rx optical frequencies as functions of time. In the example of FIG. 2A, both the LO and Rx signals are chirped—e.g., their frequency changes over time. The Rx is time delayed from the LO by a time $\tau$, which may reflect a time taken for the laser beam to travel toward the object, to be reflected from the object, and to return to the transceiver. When combined at combiner 112, the LO and Rx optical fields may interfere to produce an interference signal, which may also be referred to as a beat note. The beat note may be detected by detector 114 and the detector 114 may provide an electrical signal indicative of the beat note (e.g., a voltage, current, or other electrical signal). A Fourier transform of the interference signal (which may be performed, e.g., by processor 118 of FIG. 1 and/or other circuitry), may provide a frequency of the beat note, which may be referred to as a beat frequency. FIG. 2B illustrates a plot of signal strength vs. frequency for a Fourier transform of an interference signal. The peak shown in FIG. 2B may be at the beat frequency. The beat frequency may be given by $f_{beat}=\kappa\tau$, where $\kappa$ is the chirp rate and $\tau$ may be linearly proportional to the distance of the object. In this manner, the processor 118 may determine a distance to an object based on a chirp rate and a beat frequency of an interference signal described herein.

While FMCW ladar systems offer advantages, they have also exhibited challenges, limitations, and problems. For example, the Nyquist frequency of a digitizer (e.g., an analog to digital converter used to implement digitizer 116 of FIG. 1) has typically set the maximum heterodyne beat frequency, $f_{beat}$, and therefore the maximum range, R, that can be measured for a given chirp rate. If frequencies above the Nyquist frequency are sampled by the digitizer, such frequencies may be incorrectly detected as lower frequencies, a process that may be referred to as aliasing. Aliasing may occur because instantaneously sampling a periodic function at two or fewer times per cycle may result in missed cycles, and therefore the appearance of an incorrectly lower frequency. It may be possible to decrease the FMCW ladar chirp rate to increase the maximum range that can be measured. However, reducing the chirp rate may either result in longer chirp durations, T, which can lead to slower update rates, or smaller chirp bandwidths, B, which result in poorer resolution. Unfortunately, the other alternative has been to simply increase the sample rate, and therefore the Nyquist frequency, of the ADC, which may result in larger monetary cost of the ADCs, larger consumption of electrical power by the ADCs, poorer bit resolution, and increasing data for processing, as compared with lower-speed ADCs. Examples described herein may provide systems and methods that may increase the maximum measurable heterodyne beat frequency, $f_{beat}$, without compromising, or without compromising as significantly, the advantages of lower-speed ADCs. For some automotive lidar or metrology applications, for example, the cost and processing demand may be important considerations in selecting an ADC. Examples described herein may in some circumstances allow the use of lower-sample-rate ADCs, which may be lower cost, and which may output fewer sampled points per unit time, which may allow for faster data processing. These benefits may be achieved without compromising, or without compromising as significantly (relative to systems not utilizing systems and techniques described herein) the range window, resolution, or update rate of the FMCW ladar system in some examples.

Accordingly, examples described herein may provide and/or improve an ability to measure and quantify an object range (or other property) that corresponds and/or relates to a measurement frequency that is greater than the Nyquist frequency of a particular digitizer (e.g., ADC). Example methods and apparatuses disclosed may, for sparse FMCW ladar return signals in the frequency domain, disambiguate aliased range returns sampled by an ADC, and therefore determine the range unambiguously (and/or less ambiguously) even in the presence of aliasing.

Figure 3:
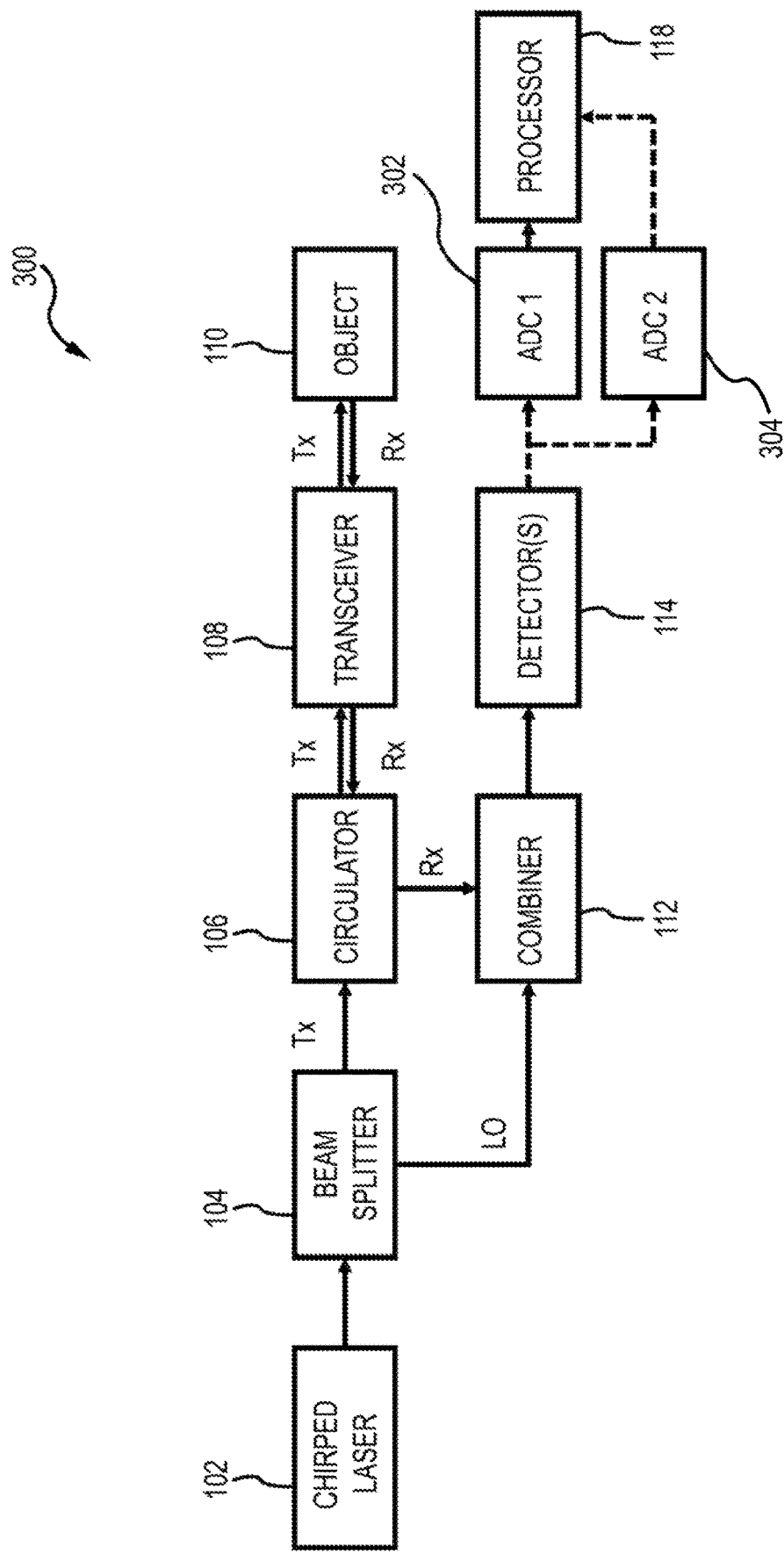
FIG. 3 is a schematic illustration of a system 300 in accordance with examples described herein.

In some examples described herein, an interference signal may be digitized multiple times using multiple sample rates (e.g., digitizers having different Nyquist frequencies), to disambiguate a property (e.g., distance/range) of an object in the presence of aliasing. FIG. 3 is a schematic illustration of a system arranged in accordance with examples described herein. The system 300 of FIG. 3 utilizes two digitizers (e.g., two ADCs) that may be used to measure ranges associated with beat frequencies which are greater than the Nyquist frequency of either or both of the ADCs. The system 300 includes laser source 102, beam splitter 104, circulator 106, transceiver 108, combiner 112, detector 114, first analog to digital converter 302, second analog to digital converter 304, and processor 118. The system 300 may be used to measure a property of (e.g., distance to) object 110. The operation and implementation of laser source 102, beam splitter 104, circulator 106, transceiver 108, combiner 112, detector 114, and object 110 may be the same and/or analogous to that described herein with reference to FIG. 1. The processor 118 may be implemented in the same or analogous manner to that described herein with reference to FIG. 1, however the processor 118 in FIG. 3 may process signals differently and/or process different signals as described herein. In some examples, additional, fewer, and/or different components may be used than those shown in FIG. 3.

As described with reference to FIG. 1, the detector 114 may provide an interference signal which may be an electronic signal and may include information used to determine a property of object 110 (e.g., distance to the object 110).

In examples described herein, multiple digitizers may be provided, as shown in FIG. 3 including analog to digital converter 302 and analog to digital converter 304. While two digitizers are shown in FIG. 3, any number may be used in other examples, including 3, 4, 5, or 6 digitizers. Other numbers of digitizers may be used in other examples. The analog to digital converter 302 and/or analog to digital converter 304 may have a Nyquist frequency which is less than a beat frequency associated with a distance intended to be measured by the system. Generally, a Nyquist frequency may refer to a frequency which is half the sampling frequency of the ADC. The Nyquist frequency may also be referred to as the folding frequency. In some situations, the distance to the object 110 may be such that the beat frequency of a resulting interference signal is below the Nyquist frequency of the analog to digital converter 302 and/or analog to digital converter 304. However, the system 300 may also be used when the distance to the object 110 may be associated with an interference signal beat frequency greater than the Nyquist frequency of analog to digital converter 302, analog to digital converter 304, or both. Typically, such as in the example of FIG. 1, if the beat frequency of the interference signal were greater than the Nyquist frequency of the digitizer 116, it may result in ambiguity of the range, because the resulting signal may be aliased, and the signal at an output of the digitizer 116 may be consistent with two different ranges. However, in the example of FIG. 3, the multiple digitizers may be used to disambiguate the signal.

Accordingly, during operation, an interference signal may be provided by a frequency-modulated continuous-wave (FMCW) laser radar system. For example, the interference signal may be provided by combiner 112 and/or detector 114. Note that the interference signal may be based in part on a laser beam reflected from an object (e.g. Rx reflected from object 110). A digitizer (e.g., digitizer 116 of FIG. 1 and/or analog to digital converter 302 and/or analog to digital converter 304 of FIG. 3) may be used to digitize (e.g., sample) the interference signal. All or some of the digitizers used may have a Nyquist frequency lower than a beat frequency of the interference signal. The digitizer may produce a digitized signal, which may be consistent with multiple beat frequencies. The digitized signal may be processed (e.g., by processor 118) to select one of the multiple beat frequencies which correspond to the beat frequency actually present in the interference signal and associated with a distance to the object 110. The processor 118 may determine a distance to at least a portion of the object 110 (e.g., a surface of the object) based on the beat frequency.

For example, the analog to digital converter 302 of FIG. 3 may be used to provide a first digitized signal. The first digitized signal may be consistent with multiple candidate beat frequencies which may be contained in the interference signal (e.g., it may be unknown whether the first digitized signal has experienced aliasing). The analog to digital converter 304 of FIG. 3 may be used to provide a second digitized signal based on the interference signal. Generally, the Nyquist frequency of the analog to digital converter 304 may be different than the Nyquist frequency of the analog to digital converter 302. The second digitized signal may be consistent with another set of multiple candidate beat frequencies. The actual beat frequency, however, will be consistent with both the output of the analog to digital converter 302 and the output of the analog to digital converter 304. Accordingly, the candidate beat frequencies associated with an output of analog to digital converter 302 may be compared with the candidate beat frequencies associated with an output of analog to digital converter 304. A matching beat frequency present in both candidate groups may be identified (e.g., by the processor 118) as the correct beat frequency and used to determine a property (e.g., a distance to) object 110.

Figures 4A, 4B:
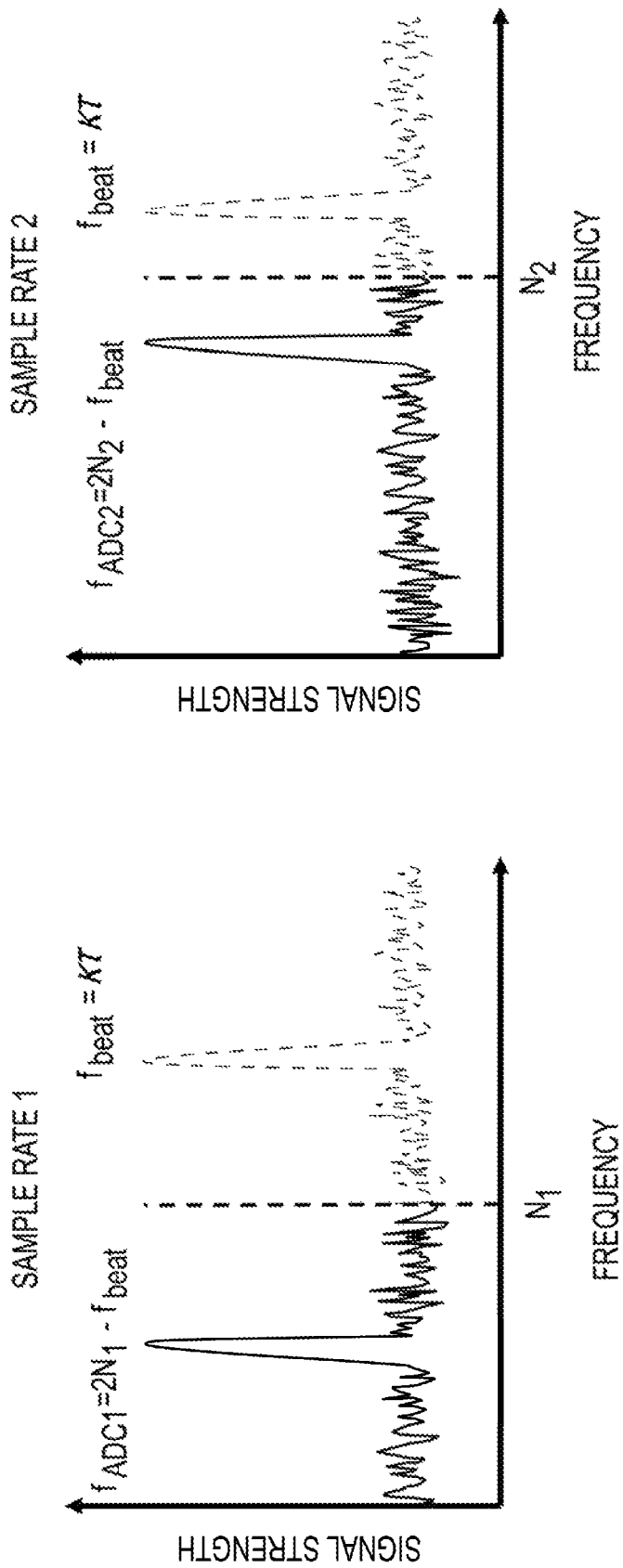
FIG. 4A is an example plot illustrating a beat frequency measured by an ADC with a first Nyquist frequency.
FIG. 4B is an example plot illustrating a beat frequency measured by another ADC with a second, different, Nyquist frequency.

FIG. 4A is an example plot illustrating a beat frequency measured by an ADC with a first Nyquist frequency (e.g., with a first sample rate). The plot in FIG. 4A may, for example, reflect an output of analog to digital converter 302 of FIG. 3. FIG. 4B is an example plot illustrating a beat frequency measured by another ADC with a second, different, Nyquist frequency (e.g., with a second, different sampling rate). The plot in FIG. 4B may, for example, reflect an output of analog to digital converter 304 of FIG. 3.

Referring to FIG. 4A, a plot is provided from an ADC (e.g., analog to digital converter 302 of FIG. 3) having a first sample rate (e.g., Sample Rate 1) and processed by a processor to produce signal strength as a function of frequency. The ADC may receive a signal including a beat frequency at $f_{beat}=\kappa\tau$ (shown in dotted lines in FIG. 4A), which may be above a Nyquist frequency, $N_1$, of the ADC. Accordingly, the ADC may provide an output having a frequency peak which is shifted (e.g., aliased). The output may include a peak at a frequency that is folded about the Nyquist frequency, e.g., $f_{ADC1}=2N_1-f_{beat}$ (shown in solid lines in FIG. 4A).

Referring to FIG. 4B, a plot is provided from a second ADC (e.g., analog to digital converter 304 of FIG. 3) having a second sample rate (e.g., Sample Rate 2)) and processed by a processor to produce signal strength as a function of frequency. The ADC may receive the same signal including a beat frequency at $f_{beat}=\kappa\tau$ (shown in dotted lines in FIG. 4B), which may be above a Nyquist frequency, N2, of the ADC. Accordingly, the ADC may provide an output having a frequency peak which is shifted (e.g., aliased). The output may include a peak at a frequency that is folded about the Nyquist frequency, e.g., $f_{ADC2}=2N_2-f_{beat}$ (shown in solid lines in FIG. 4B).

At least in part because the two frequencies measured by the first and second ADCs ($f_{ADC1}$ and $f_{ADC2}$) are different it may be possible to determine the "correct" $f_{beat}$, and therefore the correct object range, even though $f_{beat}$ does not fall below the Nyquist frequency of the ADCs.

Figure 5:
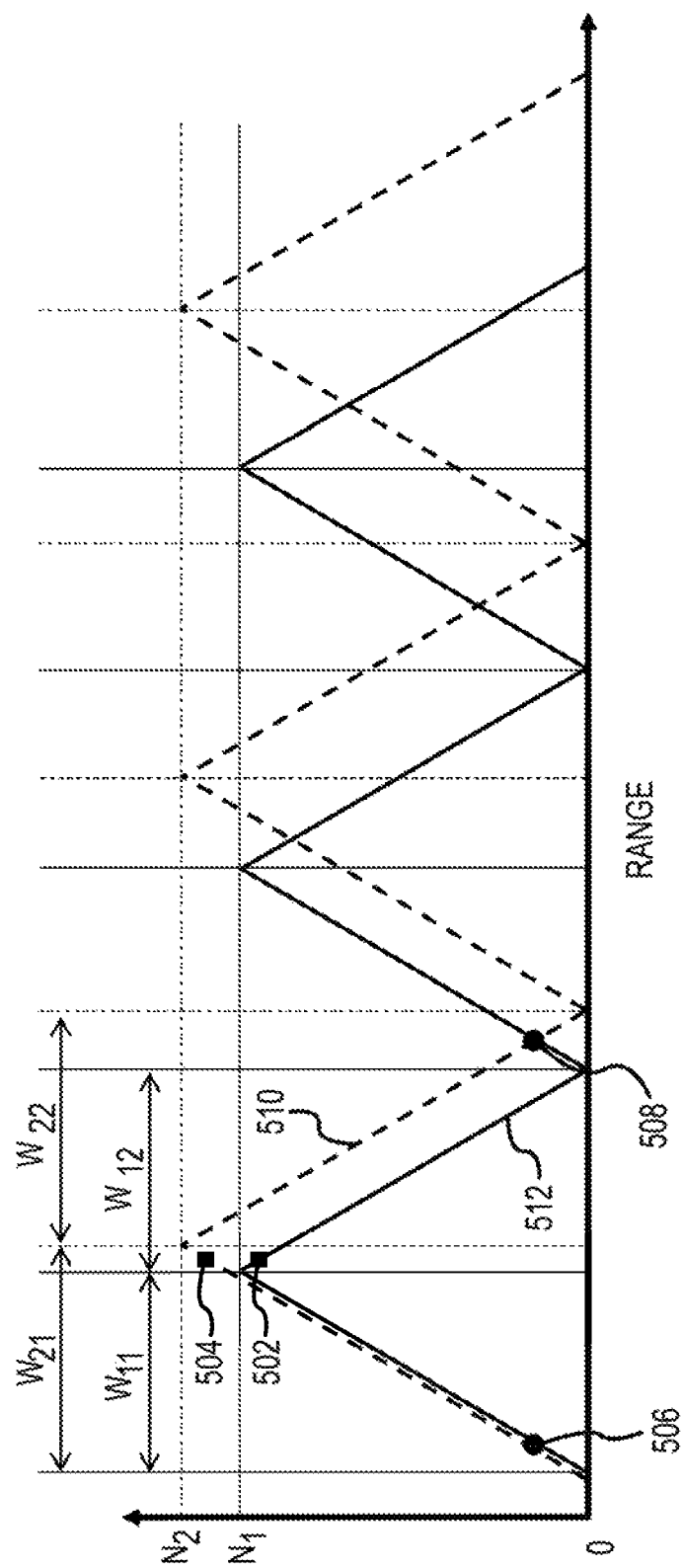
FIG. 5 is a plot of the frequency measured versus object range in accordance with examples described herein.

FIG. 5 is a plot of the frequency measured versus object range in accordance with examples described herein. For example, the plot of FIG. 5 may correspond to the output of analog to digital converter 302 and analog to digital converter 304 of FIG. 3 for various ranges, in some examples. FIG. 5 may also be consistent with the plot of FIG. 4. FIG. 5 illustrates two traces—trace 510 and trace 512, which may correspond to frequency versus range traces for two different ADCs (e.g., having two different Nyquist frequencies or sampling rates). The trace 512 may represent an output of analog to digital converter 302 (e.g., $f_{ADC1}$) of FIG. 1 while the trace 510 may represent an output of analog to digital converter 304 (e.g., $f_{ADC2}$) of FIG. 1. Horizontal lines are shown in FIG. 5 corresponding to a Nyquist frequency for analog to digital converter 302 (e.g., N1) and a Nyquist frequency for analog to digital converter 304 (e.g., N2). In the example of FIG. 5, the analog to digital converter 304 has a higher Nyquist frequency and sampling rate than analog to digital converter 302. Note that the same ADC output frequency could correspond to multiple possible ranges (e.g., multiple candidate beat frequencies) for each ADC output.

When an object is in the first range window, indicated by $w_{11}$ in FIG. 5, of the first ADC (e.g., resulting in a beat frequency, $f_{beat}$, that is below the first Nyquist frequency) the frequency measured by each ADC may be same (e.g., $f_{ADC1}=f_{ADC2}$). However, when an object is in the second range window of the first ADC, which is indicated by $w_{12}$ in FIG. 5 (e.g., at a range corresponding to an interference signal beat frequency greater than the Nyquist frequency of the ADC), the frequency measured by each ADC may be different (e.g., as was the case for the example illustrated in FIG. 4). By observing the frequencies of the first and second ADCs ($f_{ADC1}$ and $f_{ADC2}$, respectively), the range of an object may be unambiguously (and/or less ambiguously) determined. This may be true for frequencies that are up to twice the Nyquist frequency of the first ADC in some examples, and higher in some examples. For instance, if the two ADC frequencies are the same, then the measured ADC frequency directly provides the heterodyne beat frequency corresponding to the object range $f_{beat}=f_{ADC1}$. On the other hand, if the two ADC frequencies differ, then the heterodyne beat frequency corresponding to the object range may be given by $f_{beat}=N_1+(N_1-f_{ADC1})$. For example, the same an object at one particular range shown in FIG. 5 corresponds to point 502 output from analog to digital converter 302 and point 504 from analog to digital converter 304. The point 502 is above a Nyquist frequency for analog to digital converter 302. Accordingly, because the values are different, the correct beat frequency may be given by $f_{beat}=N_1+(N_1-f_{ADC1})$ in some examples.

Generally, the methodology may be used in other range windows as well. For a given beat frequency measured by analog to digital converter 302, the possible beat frequencies may be given by $f_{beat}=2*m*N_1+f_{ADC1}$, and $f_{beat}=2$ $n*N_1-f_{ADC1}$, where m are positive integers starting at zero and n are positive integers starting at one. Analogous expressions can be written for the possible beat frequencies for analog to digital converter 304. The frequencies measured by the ADCs, $f_{ADC1}$ and $f_{ADC2}$, may be determined by any of a variety of components and techniques including, but not limited to, techniques implemented by processor 118 of FIG. 1 (or another processor), such as peak fitting and maximum-finding algorithms. In some examples, it may be possible for the processor 118 to determine the "correct" beat frequency by determining the common $f_{beat}$ from the sets of possible values of $f_{beat}$ computed from the frequencies measured by analog to digital converter 302 and analog to digital converter 304. For example, a set of candidate ti, values for each of analog to digital converter 302 and analog to digital converter 304 may be calculated, such as by using the previous equations. The $f_{beat}$ value for analog to digital converter 302 may match that of analog to digital converter 304 in one of the range windows, which may reveal the correct $f_{beat}$ value corresponding to the true range to the object, from which the correct target range can be obtained.

The example of point 502 and point 504 provides an example when a true $f_{beat}$ falls in one range window for one ADC (e.g., a second range window corresponding to the second Nyquist zone for analog to digital converter 302 for point 502) and another range window for another ADC (e.g., the first range window corresponding to the first Nyquist zone for point 504 for analog to digital converter 304). The first and second range windows for analog to digital converter 302 are shown as $w_{11}$ and $w_{12}$ in FIG. 5. The first and second range windows for analog to digital converter 304 are shown as $w_{21}$ and $w_{22}$ in FIG. 5.

It is possible that more than one actual range return (e.g., from a plurality of targets), corresponding to more than one $f_{beat}$, exists for a given measurement. In some examples, each ADC may measure more than one frequency. To disambiguate multiple object range returns that may exceed the ADC Nyquist frequency, a system (e.g., processor 118 of FIG. 3) may determine the possible $f_{beat}$ values for each frequency measured by each ADC as described previously. For example, for two range returns, each ADC may be used to determine the possible $f_{beat}$ values for each of two frequencies (e.g., four frequencies in total). A system (e.g., processor 118 of FIG. 3) may search the possible values for one pair of matching frequencies for a first range return, and another pair of matching frequencies for a second range return. In some examples, additional information, including but not limited to, the range peak amplitudes, the range peak shapes, target ranges determined in previous measurements and/or the target Doppler shifts determined in previous measurements, may further be used by example systems (e.g., by processor 118 of FIG. 3) to further assist in disambiguating the range returns. More than two range returns may be treated analogously.

In some examples, and even when only one actual range return exists, range ambiguity may nonetheless exist using this technique for some ranges when $f_{ADC2}=f_{ADC1}$. For example, a range for which the first measured ADC frequency equals that of the second measured ADC frequency (such as point 506 in FIG. 5) may be ambiguous with a range in the first range window that has same measured ADC frequency (such as point 508 in FIG. 5). More generally, when the two frequencies from the ADCs are equal in a range window other than the first, there may be range ambiguity with the first range window. Such ambiguity may not be acceptable in some examples. Accordingly, in some examples, systems may not utilize a first range window for measurement of object ranges. For example, the components of FIG. 3 may be calibrated or otherwise configured such that a first range window of frequencies of analog to digital converter 302 and/or analog to digital converter 304 are not used in measuring object distances. In other examples, the processor 118 of FIG. 3 may utilize target range information from previous measurements to estimate the location of objects in cases where the beat frequencies become ambiguous. For example, the processor 118 may favor ranges which are within a particular distance of a previous range measurement when the frequency measured by an ADC signal contains an ambiguity.

Figure 6:
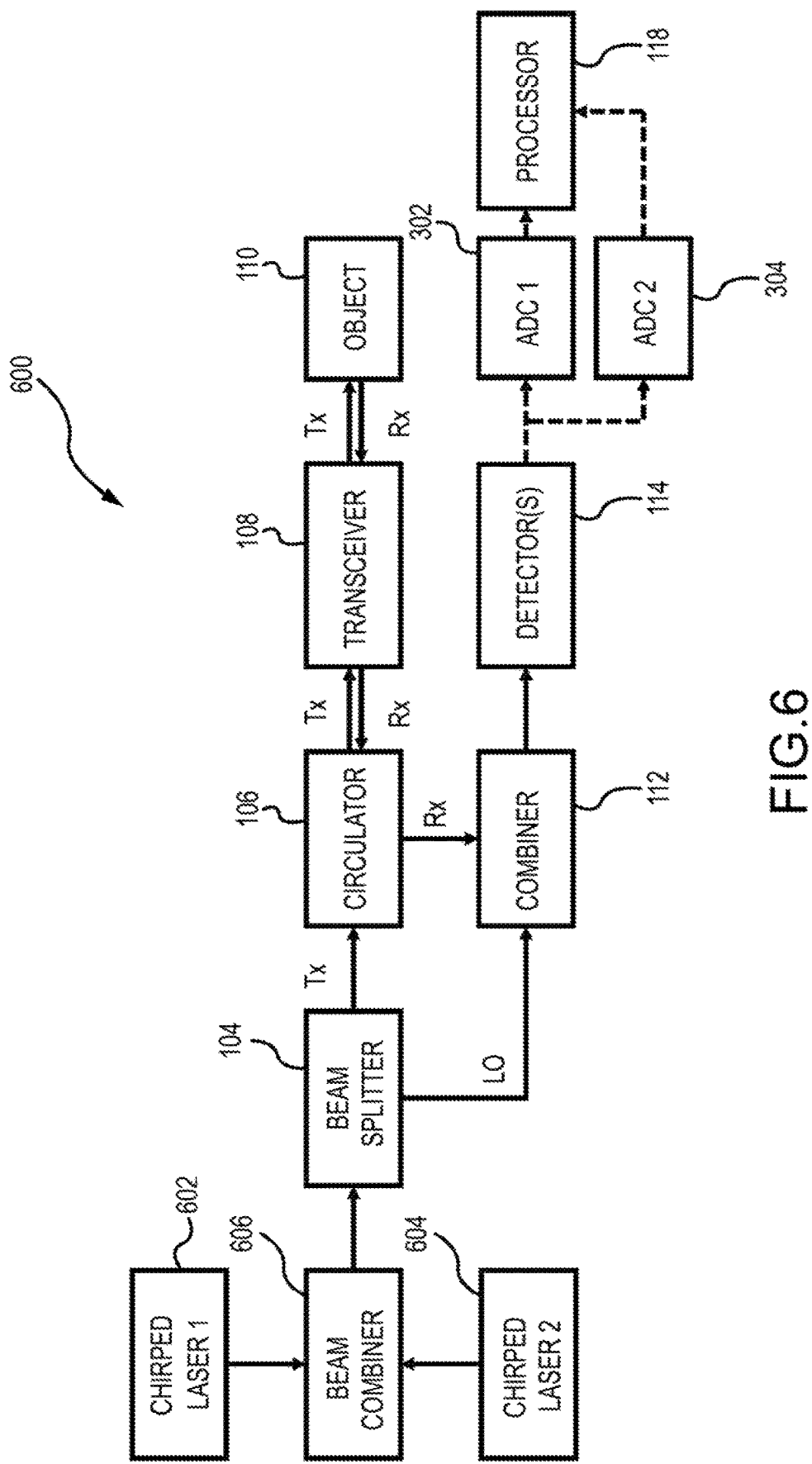
FIG. 6 illustrates a system 600 in accordance with one embodiment.

Other techniques and/or components may also be used to disambiguate (and/or reduce ambiguity) of range measurements using systems described herein. FIG. 6 is a schematic illustration of a system arranged in accordance with examples described herein. The system 600 may utilize multiple (e.g., two) chirped lasers, each with a different chirp rate. The system 600 includes laser source 602, laser source 604, combiner 606, beam splitter 104, circulator 106, transceiver 108, combiner 112, detector 114, analog to digital converter 302, analog to digital converter 304, and processor 118. The system 600 may be used to determine properties of (e.g., a distance to) object 110. The components beam splitter 104, circulator 106, transceiver 108, combiner 112, detector 114, processor 118, object 110, analog to digital converter 302, and analog to digital converter 304 may be the same as and/or analogous to the similarly numbered components described herein relative to other Figures. Additional, fewer, and/or different components may be used in other examples.

The laser source 602 may provide a first chirped laser beam, while the laser source 604 may provide a second chirped laser beam. Generally, the chirp rate of the first chirped laser beam may be different than the chirp rate of the second chirped laser beam. While shown as two sources, in some examples the two chirped laser beams may be provided by a single source. While two chirped laser beams are shown in FIG. 6, any number may be used in other examples, including 3, 4, 5, or 6 laser beams.

The chirped laser beam from laser source 602 and the chirped laser beam from laser source 604 may be combined using combiner 606. The combined beam, including two chirped laser beams, may be provided to the beam splitter 104, and the system 600 may operate analogously to that described herein with respect to other Figures having like-labeled components, such as FIG. 1 and FIG. 3.

A first interference signal may be provided to analog to digital converter 302 and analog to digital converter 304 accordingly which is based on the first chirped laser beam (e.g., from laser source 602) and a reflected beam based on a reflection of the first chirped laser beam from object 110. A second interference signal may also be provided to analog to digital converter 302 and analog to digital converter 304 may also include a component based on the second chirped laser beam (e.g., from laser source 604) and a reflection of the second chirped laser beam from object 110. In some examples, the first and second interference signals may be provided as a composite interference signals (e.g., the first and second interference signals may be components of a single interference signal). Accordingly, the analog to digital converter 302 and analog to digital converter 304 may output frequency signals pertaining to both components. In some examples, at least because the chirp rates are different for the two laser beams combined by combiner 606, the range for which ambiguity exists between the output of the two ADCs (e.g., analog to digital converter 302 and analog to digital converter 304) for the component relating to the first chirped laser beam may not be the same as the range for which ambiguity may exist between the two ADCs for the component relating to the second chirped laser beam. Accordingly, an accurate range may be identified despite aliasing and despite ambiguity from a single laser beam system.

Figure 7:
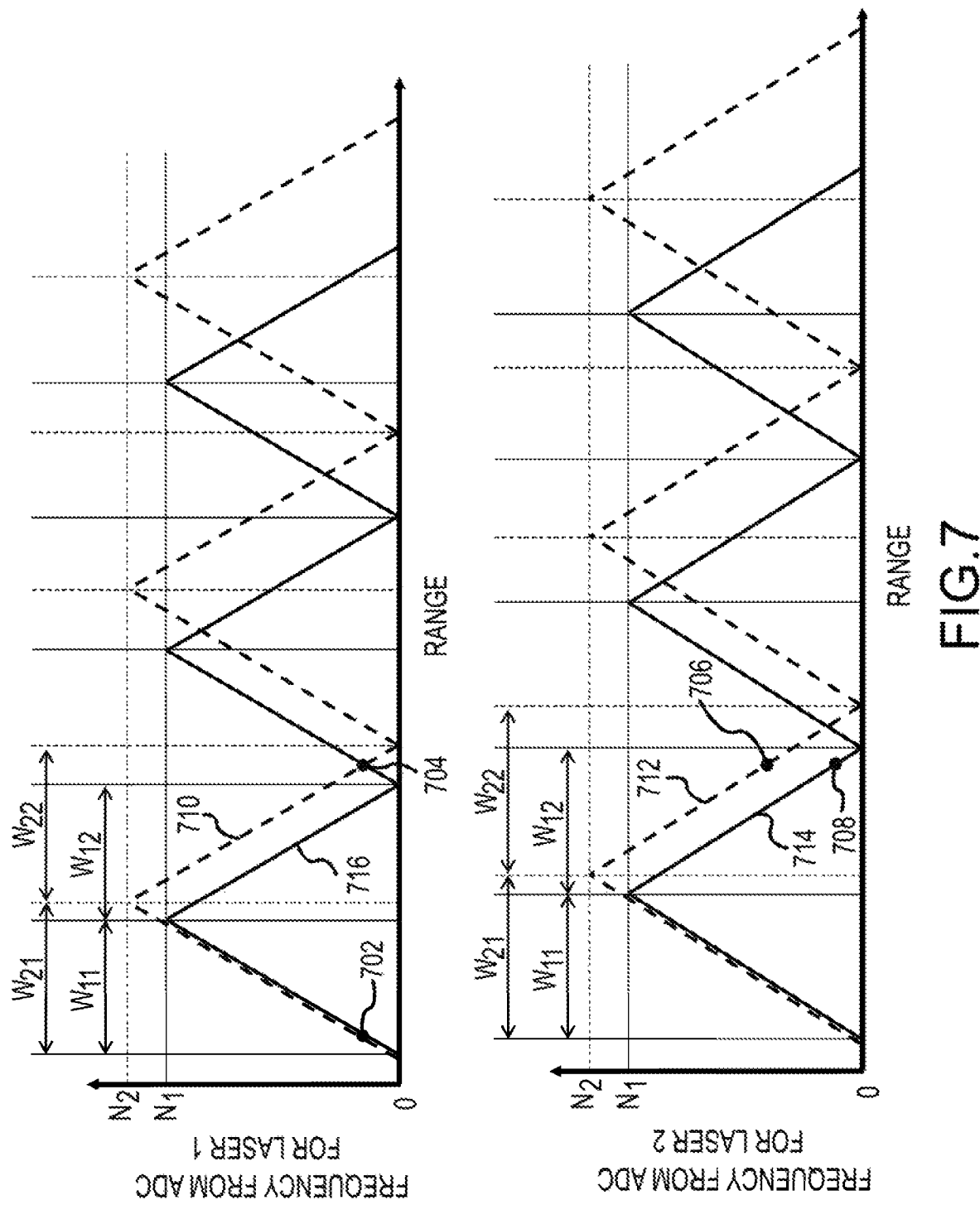
FIG. 7 includes 2 plots of measured frequency versus object range, one for each of two laser beam components, in accordance with examples described herein.

FIG. 7 includes 2 plots of measured frequency versus object range, one for each of two laser beam components, in accordance with examples described herein. The upper plot in FIG. 7 includes trace 710 and trace 716. The trace 710 may correspond with frequency versus object range for an output of analog to digital converter 302 of FIG. 6 for a component of an interference signal corresponding to the laser beam from laser source 602 (e.g., 'Laser 1' in FIG. 7). The trace 716 may correspond with frequency versus object range for an output of analog to digital converter 304 of FIG. 6 for a component of the interference signal corresponding to the laser beam from laser source 604 (e.g., 'Laser 1' in FIG. 7). The lower plot in FIG. 7 includes trace 712 and trace 714. The trace 712 may correspond with frequency versus object range for an output of analog to digital converter 302 of FIG. 6 for a component of an interference signal corresponding to the laser beam from laser source 604 (e.g., 'Laser 2' in FIG. 7). The trace 714 may correspond with frequency versus object range for an output of analog to digital converter 304 of FIG. 6 for a component of the interference signal corresponding to the laser beam from laser source 604 (e.g., 'Laser 2' in FIG. 7).

In the upper plot, for laser 1 (e.g., for the component of an interference signal pertaining to the laser beam from laser source 602 of FIG. 6), the range is such that the two frequencies from the two ADCs are equal in a range window greater than the first range window and therefore the range is ambiguous with a range in the first range window (for example, it may be difficult to disambiguate the range associated with point 702 from that associate with point 704, because both may have a same frequency output from analog to digital converter 302 and analog to digital converter 304). However, for laser 2 in the lower plot (e.g., for the component of an interference signal pertaining to the laser beam from laser source 604 of FIG. 6), at the same range associated with the ambiguous range point 704, the signals corresponding with Laser 2 are not equal—e.g., point 706 and point 708. Accordingly, an unambiguous range may be identified.

Accordingly, in some examples, processor 118 of FIG. 6 may utilize output frequencies from analog to digital converter 302 and analog to digital converter 304 pertaining to the laser beam from laser source 602 to determine a property (e.g., distance to) object 110. However, if the frequencies measured by analog to digital converter 302 and analog to digital converter 304 are the same for the component of the interference signal relating to laser source 602, then the processor 118 may utilize the frequencies measured by analog to digital converter 302 and analog to digital converter 304 for the component of the interference signal relating to the laser source 604. Other methodologies are also possible to utilize the two laser beams having different chirp rates to determine accurate range values. The addition of a second laser may also add confidence in some examples to the determination of the correct range window, when the first laser falls near zero or the Nyquist frequency, or for other reasons including compensating for Doppler shifts, compensating for speckle, or other reasons.

Generally, then, some examples of systems described herein may disambiguate (and/or lessen ambiguity in) a range determination by including an additional frequency tone for one or more digitizers (e.g., ADCs) to measure that corresponds to a same range. By providing multiple frequency signals corresponding to a same range, systems described herein may be able to discriminate between results when aliasing is present. In the example of FIG. 6 and FIG. 7, an additional frequency signal was provided by providing multiple laser sources. However, in some examples, other techniques may be used other than providing an additional laser source and/or an additional chirped laser beam. In some examples, a single laser beam may be modulated either by direct modulation or modulation external to the laser. The modulation may provide a component having a different frequency that may be used in analogous manner to provide more clarity to a range measurement.

Figure 8:
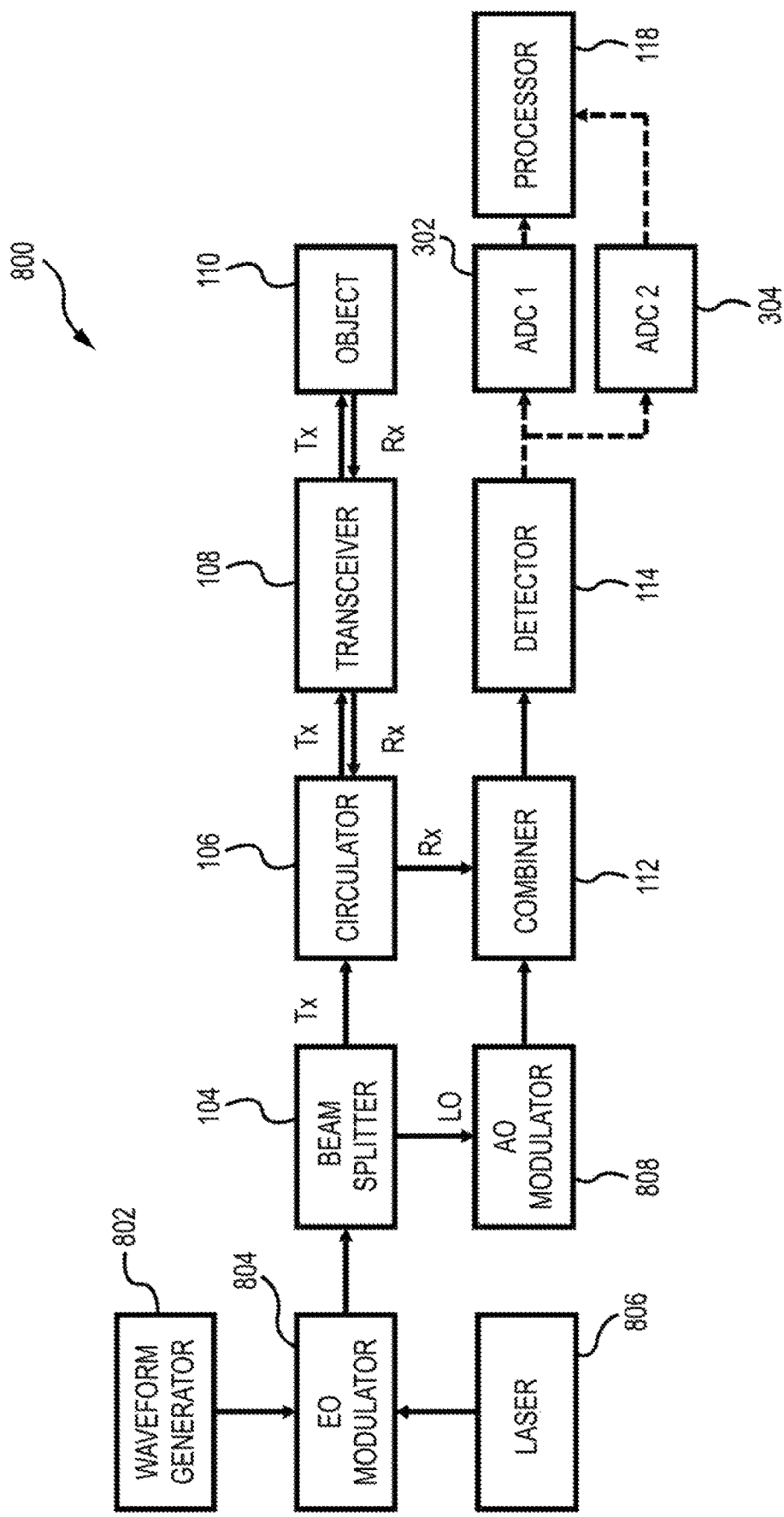
FIG. 8 is a schematic illustration of a system 800 arranged in accordance with examples described herein.

FIG. 8 is a schematic illustration of a system 800 arranged in accordance with examples described herein. The system 800 includes waveform generator 802, modulator 804, and laser source 806. The modulator 804 provides signals to beam splitter 104 which may split the received beam(s) into a Tx portion to circulator 106 and a LO portion provided to modulator 808. The modulator 808 may provide a modulated LO signal to combiner 112. The beam splitter 104, circulator 106, transceiver 108, combiner 112, detector 114, analog to digital converter 302, analog to digital converter 304, and processor 118 may be implemented by and may operate as, or analogously to, the description provided herein with reference to other Figures and elements having a same reference number. Additional, fewer, and/or different components may be used in other examples.

In the example of FIG. 8, the laser source 806 may provide a laser beam, which may not be a chirped laser beam. The laser beam may be modulated with modulator 804, which may be an electro-optic (EO) modulator. The modulation by modulator 804 may provide one or more modulation sidebands. The modulation sidebands may be chirped using waveform generator 802. While in some examples, multiple waveform generators may be provided to chirp the sidebands at different rates, in some examples the sidebands may be chirped at a same rate by the same waveform generator 802. Accordingly, a modulator 808 may be provided in the LO path (e.g., between circulator 106 and combiner 112) to cause the resulting two interference signals (and therefore beat notes) to have different frequencies when the object is at rest (e.g., no Doppler shift). One interference signal (e.g., component of a composite interference signal) may pertain to one sideband, while the other may pertain to the other sideband. This may help the two ADCs to disambiguate the object range in an analogous manner to that described with reference to FIG. 6 and FIG. 7 and components of interference signals relating to two different laser sources and/or chirped lasers.

Figure 9:
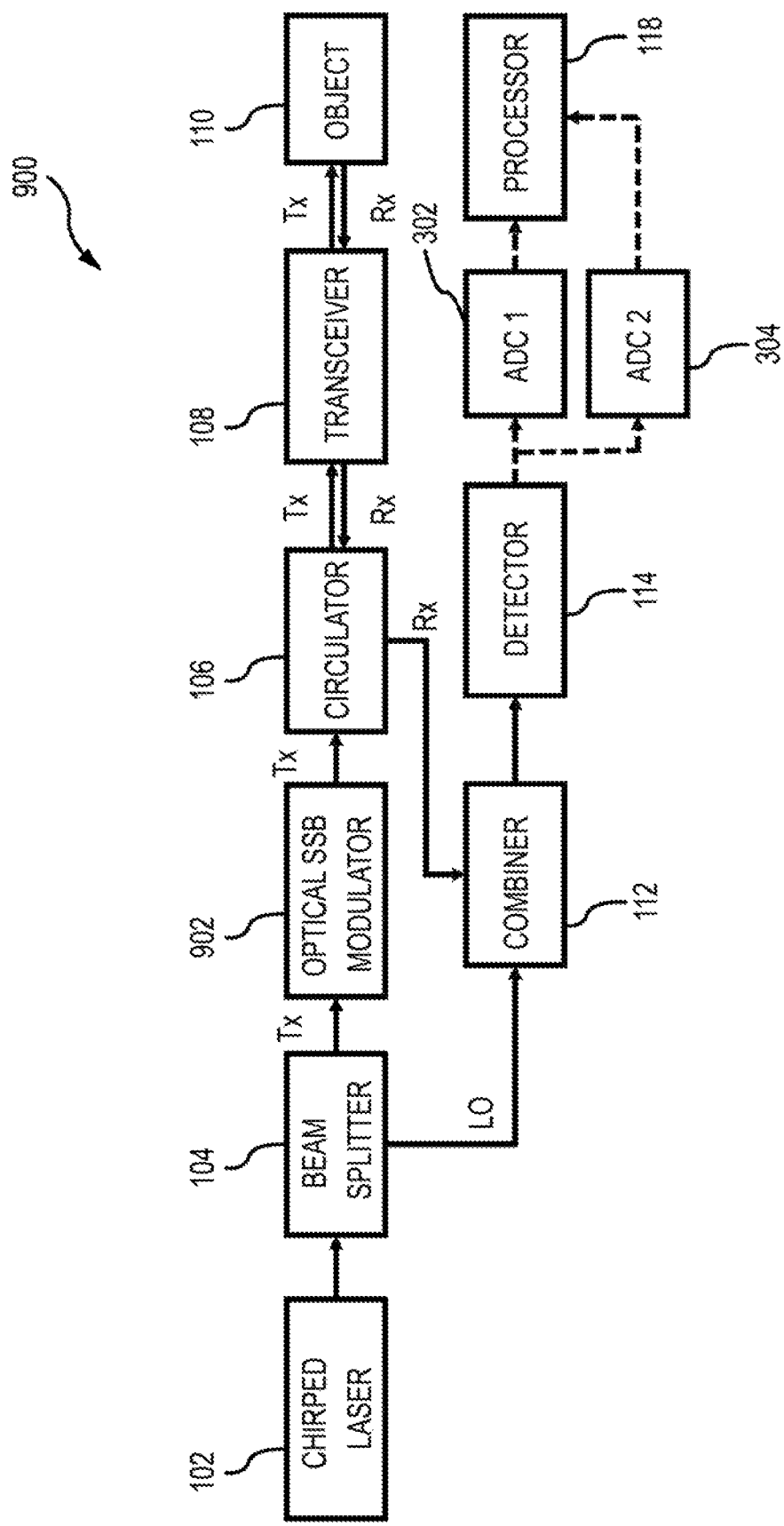
FIG. 9 is a schematic illustration of a system 900 arranged in accordance with examples described herein.

In still other examples, a single-sideband modulator may be used. FIG. 9 is a schematic illustration of a system 900 arranged in accordance with examples described herein. The system 900 includes laser source 102, beam splitter 104, modulator 902, circulator 106, transceiver 108, combiner 112, detector 114, analog to digital converter 302, analog to digital converter 304, and processor 118. The system 900 may be used to measure a property (e.g., distance to) object 110. The components of FIG. 9 may be implemented by and/or operate in a same or analogous manner to components of same reference number otherwise described herein. Additional, fewer, and/or different components may be used in other examples.

In the example in FIG. 9, the laser source 102 may provide a chirped laser beam. The chirped laser beam may be provided to beam splitter 104 to form a transmit portion Tx. The transmit portion may be modulated using modulator 902. The modulator 902 may be implemented using a single-sideband (SSB) modulator. The carrier (e.g., the chirped laser beam from laser source 102) and the single sideband provided by modulator 902 may then produce two interference signals (e.g., two components of a composite interference signal) that can be used to disambiguate the range in analogous manner to that described with reference to FIG. 6, FIG. 7, and FIG. 8.

Figure 10:
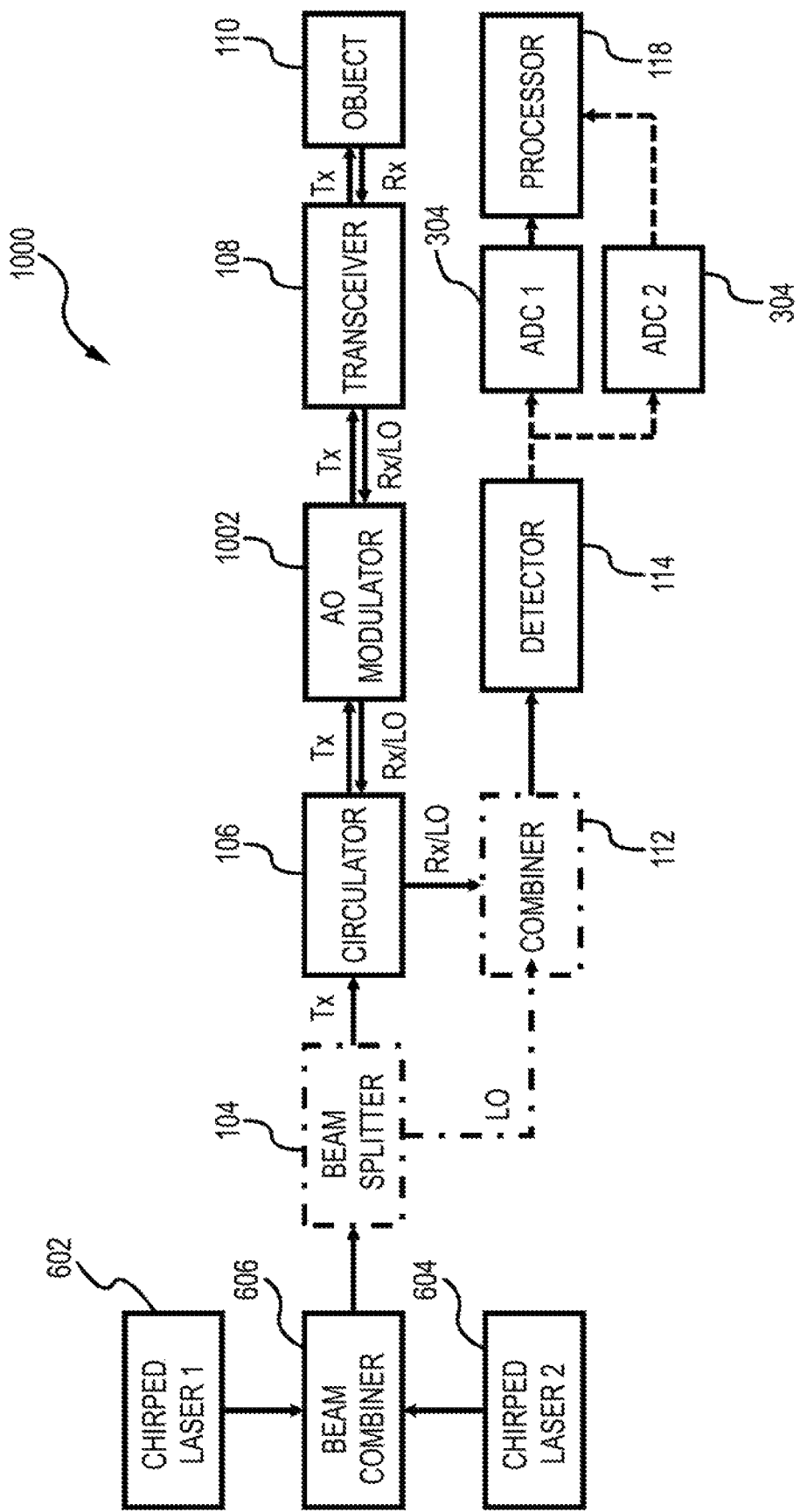
FIG. 10 is a schematic illustration of a system 1000 arranged in accordance with examples described herein.

FIG. 10 is a schematic illustration of a system 1000 arranged in accordance with examples described herein. The system 1000 includes laser source 602, laser source 604, combiner 606, beam splitter 104, circulator 106, modulator 1002, transceiver 108, combiner 112, detector 114, analog to digital converter 302, analog to digital converter 304, and processor 118. The modulator 1002 may modulate the Tx portion of the laser beam provided by beam splitter 104 and may provide a modulated laser beam to transceiver 108. The system 1000 may be used to measure a property of (e.g., distance to) object 110. The components of FIG. 10 may be implemented by and may operate in the same or analogous manner to the components having like reference numbers described herein. Additional, fewer, and/or different components may be used in other examples.

In the example of FIG. 10, the laser source 602 and laser source 604 may provide chirped laser beams. In some examples, the first chirped laser beam provided by laser source 602 may have a different chirp rate than the second chirped laser beam provided by laser source 604. In some examples, the first and second chirped laser beams may have equal and opposite chirp rates. While described as two laser sources, the laser source 602 and laser source 604 may in some examples be implemented using a single laser source and optical modulators or other components used to provide two chirped laser beams. The chirped laser beams may be combined by combiner 606 and provided to circulator 106. The modulator 1002 may be implemented using an acousto-optic modulator (AO modulator). The modulator 1002 may be a frequency shifter which may shift a frequency of the transmit beam (Tx) and provide a frequency-shifted signal to the transceiver 108.

The beam splitter 104 and the combiner 112 may be optional, and may be omitted in some examples, at least in part because a frequency-shifted LO may be provided by the modulator 1002 as described subsequently. In some examples, the modulator 1002 may be combined with the transceiver 108. Accordingly, in some examples, the combiner 606 may provide a combined laser beam to the circulator 106. The circulator 106 may provide the combined laser beam to the modulator 1002 which may shift a frequency of the transmit signal (Tx) before providing a frequency-shifted Tx to the transceiver 108. Moreover, the modulator 1002 and/or the transceiver 108 may provide a frequency-shifted LO back to the modulator 1002 and/or circulator 106. The signals may be combined at the circulator 106 in some examples.

Figure 11:
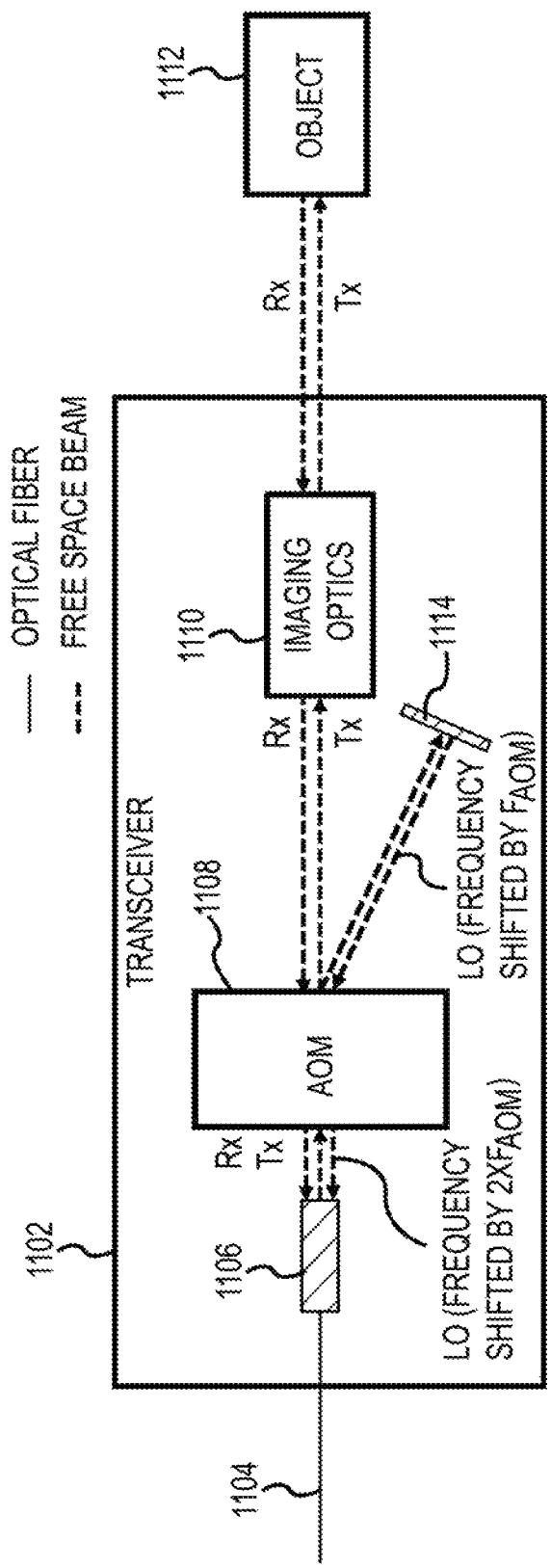
FIG. 11 is a schematic illustration of a transceiver arranged in accordance with examples described herein.

FIG. 11 is a schematic illustration of a transceiver arranged in accordance with examples described herein. For example, the modulator 108 and transceiver 1002 from FIG. 10 may be combined into the transceiver shown in FIG. 11. The transceiver 1102 includes fiber 1104, collimator 1106, modulator 1108, optics 1110 and mirror 1114. The transceiver 1102 may direct a Tx portion of a laser beam to object 1112 and may receive a reflected Rx laser beam from object 1112. The transceiver 1102 may be used to implement, for example, transceiver 108 described herein an in, for example, FIG. 10. Additional, fewer, and/or different components may be used in other examples. The solid connecting lines in FIG. 11 indicate optical fiber, while the dotted lines indicate a beam travelling in free space in some examples.

The fiber 1104 may provide a laser beam to collimator 1106. The collimator 1106 may provide the laser beam to modulator 1108. The modulator 1108 may be implemented, for example, using an acousto-optic modulator (AO modulator). The modulator 1108 may provide the unshifted (e.g., zero-order, unmodulated) laser beam (e.g., a transmit beam Tx) to optics 1110 for directing toward object 1112. The optics 1110 may provide an unmodulated beam from the modulator 1108 to the object 1112. The modulator 1108 may also provide a frequency-shifted (e.g. first order, modulated) local oscillator (LO) portion by directing a frequency-shifted laser beam from the modulator 1108 toward a mirror 1114 (or other reflective surface, which may be a reflective surface of the modulator) which may reflect the beam and provide a frequency-shifted LO back to the modulator 1108 and to the collimator 1106. In some examples, at least in part because the LO portion is deflected twice by the modulator 1108, it may have a frequency shift equal to twice the modulator 1108 drive frequency. Both the LO and a reflected laser beam received (e.g., Rx) may be provided back to collimator 1106 and output on fiber 1104. Applying a frequency shift to one or both of the Tx or LO beams from one or both of the lasers may be used to disambiguate or determine range from velocity (e.g., Doppler) for any Nyquist zone. This is because the beat frequencies may be different even for equal, but opposite, chirp rates, as discussed previously related to FIG. 8.

Figure 12:
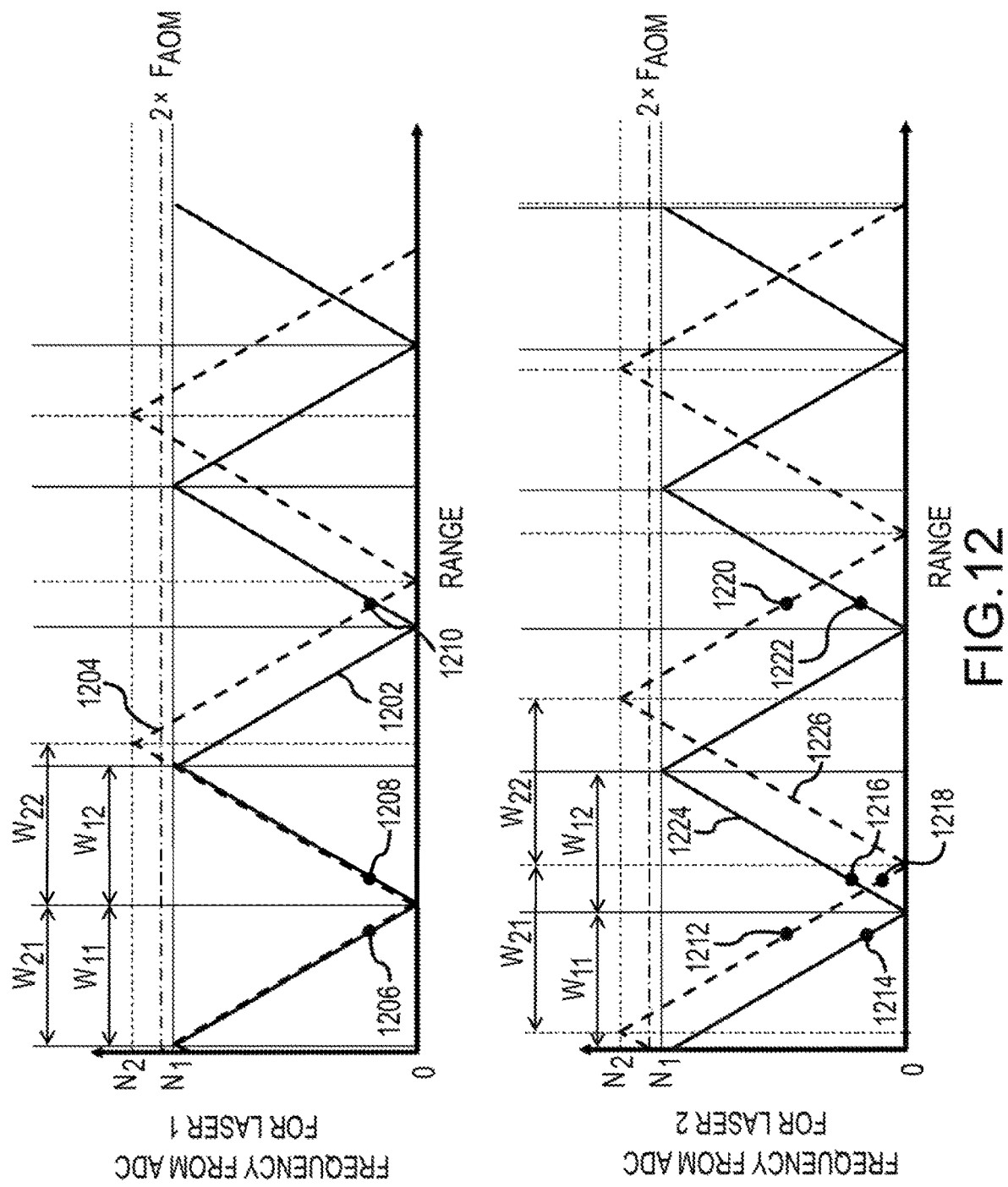
FIG. 12 includes 2 plots of measured frequency versus object range, one for each of two laser beam components, in accordance with examples described herein.

Applying a frequency shift may also be used to disambiguate range when one or more beat frequencies are greater than the Nyquist frequency of one or more ADC. FIG. 12 includes 2 plots of measured frequency versus object range, one for each of two laser beam components, in accordance with examples described herein. The plots of FIG. 12 provide example plots from a system using a transceiver, such as transceiver 1102 of FIG. 11 in a system, such as system 1000 that utilizes two chirped laser beams having equal and opposite chirp rates.

The upper plot includes trace 1202 and trace 1204. The trace 1202 and trace 1204 may illustrate measurements pertaining to an interference signal based on the laser beam from laser source 602 of FIG. 10 (e.g., Laser 1 as shown in FIG. 12). The trace 1202 may illustrate measurements taken by analog to digital converter 302 of FIG. 10, while the trace 1204 may illustrate measurements taken by analog to digital converter 304 of FIG. 10.

The lower plot includes trace 1224 and trace 1226. The trace 1224 and trace 1226 may illustrate measurements pertaining to an interference signal based on the laser beam from laser source 604 of FIG. 10 (e.g., Laser 2 as shown in FIG. 12). The trace 1224 may illustrate measurements taken by analog to digital converter 302 of FIG. 10, while the trace 1226 may illustrate measurements taken by analog to digital converter 304 of FIG. 10.

In this example, the modulator 1108 may have a drive frequency ($F_{AOM}$). The drive frequency may be selected such that $2 \times F_{AOM}$ is above the first digitizer Nyquist frequency (e.g., the Nyquist frequency of analog to digital converter 302) and below the second digitizer Nyquist frequency (e.g., the Nyquist frequency of analog to digital converter 304). Here, the beat frequencies associated with Laser 1, and measured by analog to digital converter 302 and analog to digital converter 304, may result in ambiguous range measurements, such as in the first two Nyquist zones, in part due to the downward direction of the Laser 1 frequency chirp. For example, the point 1206, point 1208, and point 1210 may result in ambiguous range measurements using the Laser 1 (e.g., the frequency at those points may correspond to multiple ranges). However, looking at the lower plot associated with Laser 2, at the same range as point 1206, the analog to digital converter 302 and analog to digital converter 304 provide different values, as shown by point 1212 and point 1214. Similarly, at the same range as point 1208, the analog to digital converter 302 and analog to digital converter 304 provide different values, as shown by point 1216 and point 1218. At the same range as point 1210, the analog to digital converter 302 and analog to digital converter 304 provide different values, as shown by point 1220 and point 1222.

In the example of FIG. 12, one laser may always and/or mostly be chirping in the upward direction. Accordingly, this system and technique may allow unambiguous measurements of the "correct" beat frequencies while also allowing for compensation or measurement of other effects, such as Doppler shifts, velocity, speckle, or others. Other methods of adding additional frequency tones to disambiguate the range may also be possible in other examples.

While examples described herein have been described with reference to the use of two ADCs (e.g., two digitizers), in some examples a third (or more) ADC may be included with a sample rate that is different from the first or second ADC. Signal from the third ADC may be used, for example, to disambiguate the object range when $f_{ADC2} = f_{ADC1}$. In this case, $f_{ADC3}$ may be used to determine the "correct" $f_{beat}$ value in a manner analogous to those described herein.

Figure 13:
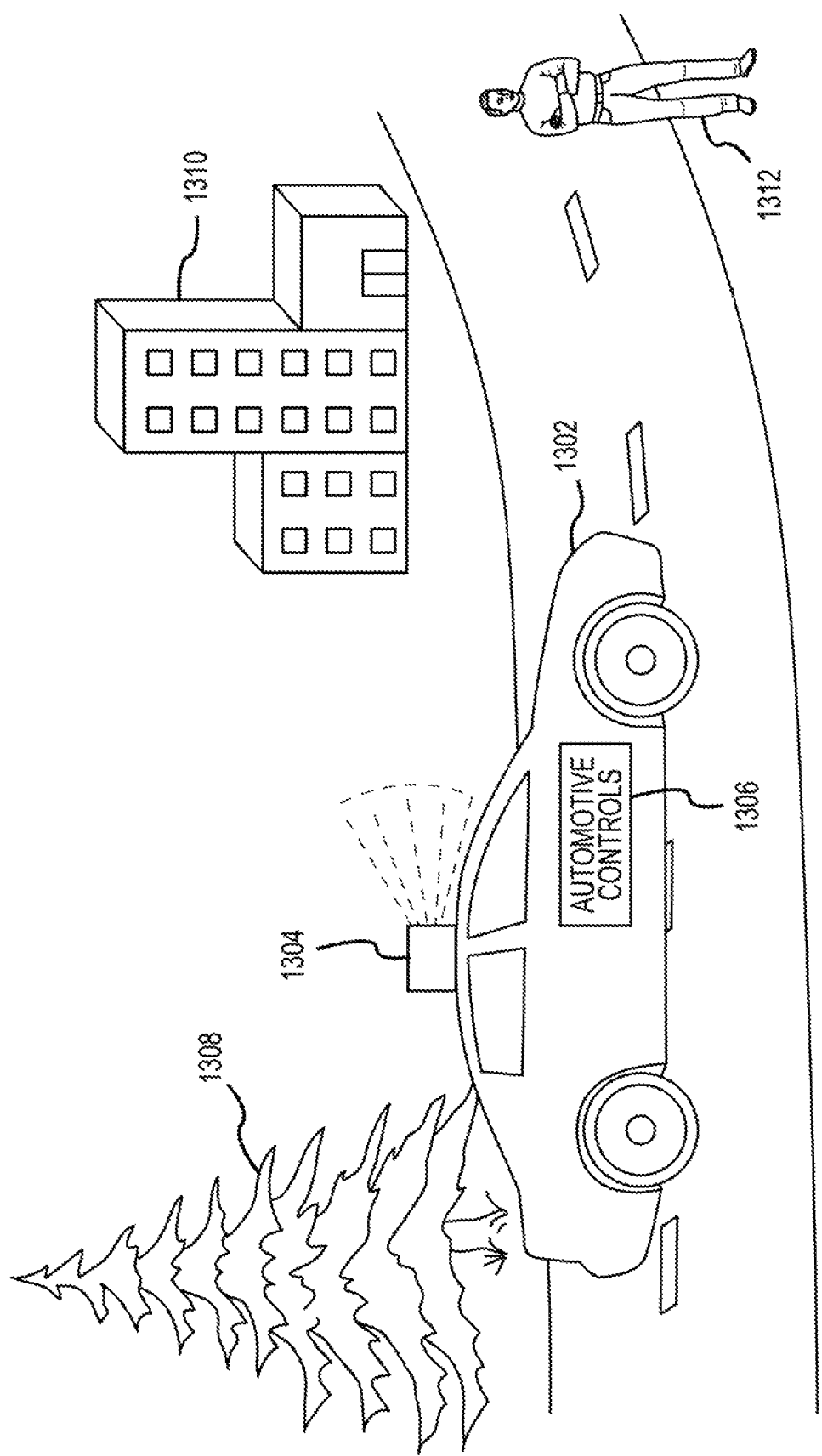
FIG. 13 is a schematic illustration of an automotive lidar application in accordance with examples described herein.

FIG. 13 is a schematic illustration of an automotive LiDAR application arranged in accordance with examples described herein. The LiDAR application includes automobile 1302, lidar system 1304, automotive controls 1306, tree 1308, building 1310, and person 1312. Additional, fewer, and/or different examples may be used.

LiDAR systems described herein, such as system 100, system 300, system 600, system 800, system 900, and/or system 1000 may be used to implement lidar system 1304. While shown as an automobile 1302, other moving objects may make use of lidar system 1304 in other examples. For example, an aircraft, drone, helicopter, boat, and/or bicycle may be used.

Automotive LiDAR applications may provide a LiDAR system, such as lidar system 1304 on, in, and/or in communication with an automobile, such as automobile 1302. The lidar system 1304 is depicted mounted on a roof of automobile 1302, however other positions may be used (e.g., in the dash, under the hood). The lidar system 1304 may direct one or more laser beams toward targets in the scene.

Any number or kind of targets (e.g., surfaces) may be measured using LiDAR systems described herein, including tree 1308, building 1310, and/or person 1312. In some examples, targets may include other automobiles, aircraft, drones, etc. Accordingly, LiDAR systems described herein may provide distance measurements for multiple objects in a scene.

The automotive controls 1306 may be in communication with the lidar system 1304 to configure, start, stop, and/or interact with the lidar system 1304. The automotive controls 1306 may additionally or instead receive an output of the lidar system 1304 and take action based on the output, including to change speed and/or heading.

Distance and/or velocity measurements described herein may be used by the automotive controls 1306 to, for example, develop a 3D map of a scene. With a 3D map of the scene, more accurate commands and control may be provided by the automotive controls 1306. In some examples the 3D map, distance, and/or velocity measurements may be displayed to a driver of the automobile 1302 and/or other individuals in communication with the lidar system 1304. In some examples (e.g., in autonomous and/or semi-autonomous vehicle operation), the automotive controls 1306 may cause the automobile 1302 to start, stop, turn, change direction, speed up and/or slow down based on the distance measurements and/or 3D map of the scene.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A method comprising:
providing an interference signal from a frequency-modulated continuous-wave (FMCW) laser radar system, the interference signal based in part on a laser beam reflected from an object;
digitizing the interference signal using a digitizer including a first analog to digital converter (ADC) having a Nyquist frequency lower than an actual beat frequency of the interference signal and a second ADC with a second Nyquist frequency to produce a digitized signal, the digitized signal consistent with multiple candidate beat frequencies, wherein the digitized signal includes a first digitized signal corresponding to an output of the first ADC and a second digitized signal corresponding to an output of the second ADC;
processing the first and the second digitized signals to select one of the multiple candidate beat frequencies corresponding to the actual beat frequency; and
determining a distance to at least a portion of the object based on the beat frequency.

2. The method of claim 1, wherein the first digitized signal is consistent with first multiple beat frequencies,
wherein the second digitized signal is consistent with a second set of multiple candidate beat frequencies; and
wherein processing comprises selecting a matching one from the first and second set of multiple candidate beat frequencies.

3. The method of claim 1, further comprising providing at least another interference signal, the at least another interference signal based in part on another laser beam reflected from the object, and wherein the laser beam and the another laser beam are each chirped beams.

4. The method of claim 3, further comprising:
generating the laser beam and the another laser beam from separate laser sources.

5. The method of claim 3, further comprising:
generating the laser beam and the another laser beam from a same laser source.

6. The method of claim 1 further comprising:
modulating the laser beam to generate one or more modulation sidebands.

7. The method of claim 1, further comprising:
providing multiple interference signals, the multiple interference signals corresponding to reflections of the laser beam from multiple objects; and
determining the distance to the multiple objects.

8. The method of claim 1, further comprising:
providing a second interference signal having a second beat frequency corresponding to the distance;
digitizing the second interference signal using the digitizer to produce a second digitized signal; and
selecting one of the multiple beat frequencies further based on the second digitized signal.

9. The method of claim 8, wherein the second interference signal is based on a reflection of a second laser beam from the object.

10. The method of claim 8, wherein the second interference signal is based on a reflection of a modulated version of the laser beam from the object.

11. A system comprising:
at least one chirped laser beam configured to be directed toward, at least partially reflected by, an object to provide a reflected laser beam;
a detector configured to combine the at least one chirped laser beam with the reflected laser beam to provide an interference signal;
a first analog to digital converter configured to provide a first digital signal based on the interference signal, the first analog to digital converter having a first Nyquist frequency below a beat frequency of the interference signal;
a second analog to digital converter configured to provide a second digital signal based on the interference signal, the second analog to digital converter having a second Nyquist frequency; and
at least one processor configured to determine a range to the object based on the first digital signal and the second digital signal.

12. The system of claim 11, wherein the first digital signal is consistent with a first set of multiple candidate beat frequencies and the second digital signal is consistent with a second set of multiple candidate beat frequencies, and wherein the at least one processor is configured to identify an actual beat frequency based on a candidate beat frequency included in both the first set of multiple candidate beat frequencies and the second set of multiple candidate beat frequencies.

13. The system of claim 11, wherein the first Nyquist frequency and the second Nyquist frequency are different frequencies.

14. A method comprising:
chirping a first laser beam and a second laser beam in opposite directions to provide a first chirped beam and a second chirped beam;
providing a first local oscillator beam based on the first chirped beam and a second local oscillator beam based on the second chirped beam;
applying a frequency shift to the first chirped beam and the second chirped beam to provide a frequency shifted first chirped beam and a frequency shifted second chirped beam;
directing the first chirped beam and the second chirped beam toward an object;
receiving a first reflected beam corresponding to reflection of the first chirped beam from the object and a second reflected beam corresponding to a reflection of the second chirped beam from the object;
generating a first interference signal between the first reflected beam and the first local oscillator beam and generating a second interference signal between the second reflected beam and the second local oscillator beam; and
digitizing the first interference signal with a first analog to digital converter (ADC) having a first Nyquist frequency below an actual beat frequency of the first interference signal and with a second ADC having a second Nyquist frequency below the actual beat frequency of the first interference signal to generate a first pair of digitized signals;
digitizing the second interference signal with the first ADC and the second ADC to generate a second pair of digitized signals;
determining a distance to the object based on the first pair of digitized signals and the second pair of digitized signals.

15. The method of claim 14, wherein said applying the frequency shift comprises applying the frequency shift using an acousto-optic modulator.

16. The method of claim 14, wherein said applying the frequency shift comprises applying the frequency shift using a carrier-suppressed single-sideband modulator.

17. The method of claim 14, further comprising determining a velocity of the object based on the first interference signal and the second interference signal.

18. The method of claim 14, further comprising:
digitizing the first interference signal into a first pair of digitized signals including a first digitized signal from the first ADC and a second digitized signal from the second ADC;
digitizing the second interference signal into a second pair of digitized signals including a third digitized signal from the first ADC and a fourth digitized signal from the second ADC,
wherein each of the first digitized signal, the second digitized signal, the third digitized signal, and the fourth digitized signal are each consistent with respective multiple beat frequencies;
identifying multiple candidate frequencies consistent with both the first digitized signal and the second digitized signal; and
selecting the actual beat frequency from the multiple candidate frequencies based on the third digitized signal and the fourth digitized signal.

19. A system comprising:
at least one laser source, the at least one laser source configured to generate a first chirped laser and a second chirped laser, the first chirped laser and the second chirped laser chirped in opposite directions;
a modulator configured to provide a shifted version of the first chirped laser and the second chirped laser for use as a first local oscillator and a second local oscillator;

a combiner configured to combine the first local oscillator with a reflection of the first chirped laser from an object, and to combine the second local oscillator with a reflection of the second chirped laser from the object to generate a first interference signal and a second interference signal, respectively;

a first analog to digital converter configured to digitize the first interference signal, the first analog to digital converter having a Nyquist frequency below a beat frequency of the first interference signal;

a second analog to digital converter configured to digitize the first interference signal, the second analog to digital converter having a second Nyquist frequency below the beat frequency; and a processor configured to determine a range to at least a portion of the object using the first interference signal and the second interference signal.

20. The system of claim 19, wherein the modulator comprises an acousto-optic modulator.

21. The system of claim 19, wherein the modulator comprises a single-sideband modulator.

* * * * *